US011785463B2

(12) United States Patent
Maass et al.

(10) Patent No.: US 11,785,463 B2
(45) Date of Patent: Oct. 10, 2023

(54) DEVICE PROVISIONING AND AUTHENTICATION

(71) Applicant: Motional AD LLC, Boston, MA (US)

(72) Inventors: Michael Maass, Pittsburgh, PA (US); Karl Robinson, Norwell, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/592,583

(22) Filed: Feb. 4, 2022

(65) Prior Publication Data
US 2022/0159461 A1 May 19, 2022

Related U.S. Application Data

(63) Continuation of application No. 17/083,679, filed on Oct. 29, 2020, now Pat. No. 11,246,032.

(51) Int. Cl.
H04W 12/069 (2021.01)
H04W 4/38 (2018.01)
(Continued)

(52) U.S. Cl.
CPC ......... *H04W 12/069* (2021.01); *H04L 9/0866* (2013.01); *H04L 9/3268* (2013.01);
(Continued)

(58) Field of Classification Search
CPC ........... H04W 12/069; H04W 12/0433; H04W 12/71; H04W 4/40; H04W 12/033; H04W 4/38; H04L 9/3268; H04L 9/0866
See application file for complete search history.

(56) References Cited

U.S. PATENT DOCUMENTS 7,171,555 B1  1/2007 Salowey et al.
11,240,043 B1 * 2/2022 Leblang ............... H04L 67/025
(Continued)

FOREIGN PATENT DOCUMENTS

CN  108432180  8/2018
CN  108768664  11/2018
(Continued)

OTHER PUBLICATIONS

[No Author Listed], "SAE: Surface Vehicle Recommended Practice, Taxonomy and Definitions for Terms Related to Driving Automation Systems for On-Road Motor Vehicles," SAE International, Sep. 30, 2016, 30 pages.

*Primary Examiner* — Mazda Sabouri
(74) *Attorney, Agent, or Firm* — Fish & Richardson P.C.

(57) ABSTRACT

Among other things, techniques are described for provisioning and authentication of devices in vehicles. In one aspect, a device in a vehicle establishes a communication session with a network server that manages provisioning of devices corresponding to an enterprise associated with the vehicle. The device receives instructions from the network server to generate cryptographic keys, and in response, generates a public and private key pair. The device sends, to the network server, a certificate signing request that includes the public key and an identifier of the device. In response, the device receives a digital security certificate for the device, and a security certificate of a signing certificate authority. The device authenticates the security certificate of the certificate authority using a known enterprise root certificate, and upon successful authentication, stores the device security certificate and the security certificate of the signing certificate authority.

21 Claims, 20 Drawing Sheets

(51) Int. Cl.
  *H04W 4/40* (2018.01)
  *H04W 12/0433* (2021.01)
  *H04W 12/71* (2021.01)
  *H04W 12/033* (2021.01)
  *H04L 9/08* (2006.01)
  *H04L 9/32* (2006.01)

(52) U.S. Cl.
  CPC ............... *H04W 4/38* (2018.02); *H04W 4/40* (2018.02); *H04W 12/033* (2021.01); *H04W 12/0433* (2021.01); *H04W 12/71* (2021.01)

(56) References Cited

U.S. PATENT DOCUMENTS

| | | | |
|---|---|---|---|
| 11,246,032 | B1 | 2/2022 | Maass et al. |
| 2015/0222604 | A1 | 8/2015 | Ylonen |
| 2016/0087804 | A1* | 3/2016 | Park .................... H04L 9/3268 713/156 |
| 2016/0119151 | A1 | 4/2016 | Park et al. |
| 2016/0344561 | A1 | 11/2016 | Grajek |
| 2018/0006829 | A1 | 1/2018 | Kravitz et al. |
| 2018/0186309 | A1 | 7/2018 | Batten et al. |
| 2019/0026458 | A1 | 1/2019 | Choules et al. |
| 2019/0074982 | A1 | 3/2019 | Hughes |
| 2019/0207915 | A1 | 7/2019 | Schaap |
| 2020/0195645 | A1 | 6/2020 | Wei |
| 2020/0244652 | A1 | 7/2020 | Iyer et al. |
| 2020/0358764 | A1* | 11/2020 | Hojilla Uy ............ H04L 9/0866 |
| 2020/0409678 | A1 | 12/2020 | Ju et al. |
| 2021/0044972 | A1* | 2/2021 | Murray ................. G06F 21/602 |
| 2021/0167962 | A1 | 6/2021 | Wang et al. |
| 2021/0266185 | A1 | 8/2021 | Konda et al. |
| 2021/0273817 | A1 | 9/2021 | Deriso et al. |
| 2022/0029982 | A1* | 1/2022 | Juma .................... H04L 63/166 |

FOREIGN PATENT DOCUMENTS

| | | |
|---|---|---|
| CN | 110098935 | 8/2019 |
| CN | 110705985 | 1/2020 |
| KR | 1020180049163 | 5/2018 |
| KR | 1020190015508 | 2/2019 |
| WO | WO 2019/050527 | 3/2019 |
| WO | WO 2020/199134 | 10/2020 |

\* cited by examiner

DEVICE PROVISIONING AND AUTHENTICATION

CROSS-REFERENCE TO RELATED APPLICATION

This application is a continuation of U.S. application Ser. No. 17/083,679, filed Oct. 29, 2020, now allowed, the entirety of which is incorporated by reference.

FIELD OF THE INVENTION

This description relates to device provisioning and authentication of electronic devices that are components in a vehicle.

BACKGROUND

Autonomous or semi-autonomous vehicles include various electronic components to facilitate operations of the vehicles, e.g., sensors to gather information about the surrounding environment, processors to process the sensor information to control steering or braking, or both, among others. The various electronic components exchange information among themselves, or with external remote servers, using message exchanges.

DETAILED DESCRIPTION

Figure 1:
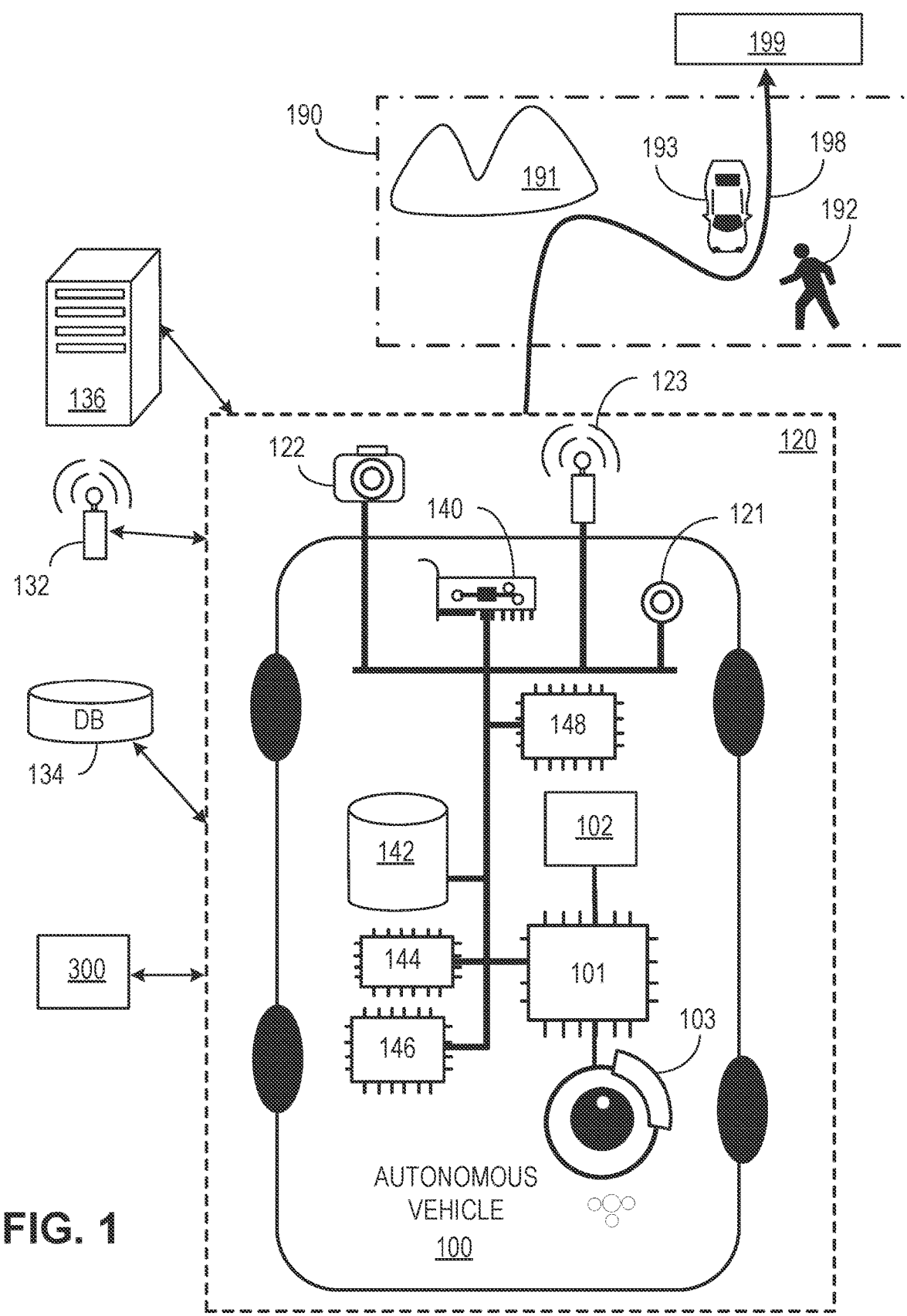
FIG. 1 shows an example of a vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture

4. Autonomous Vehicle Inputs
5. Autonomous Vehicle Planning
6. Autonomous Vehicle Control
7. Device Provisioning and Authentication
8. Example Processes for Device Provisioning and Authentication General Overview In an embodiment, an electronic device that is a component in a vehicle, such as an autonomous vehicle (AV), is assigned one or more cryptographically secure digital certificates (also referred to as "security certificates" or simply "certificates") to enable the device to authenticate itself to another entity (e.g., an entity that can make updates to the firmware of the device), or authenticate the identity of the other entity, or both. For example, the electronic device (also referred to simply as a "device") can use security certificates to authenticate a manifest server that provides the boot files, firmware, or other configuration information, for configuring the operations of the device. Subsequent to the authentication, the manifest server can update the device firmware.

In an embodiment, the device is provisioned for use in a vehicle of a plurality of vehicles managed by an enterprise, which can be, for example, a car rental organization, a public or private transit company or agency, or other suitable organization that manages a plurality of vehicles. In this context, provisioning a device in a vehicle refers to providing a device with one or more cryptographic keys or security certificates, or both, such that the device can perform authenticated communication with other entities in the vehicle, or with external entities (for example, remote servers) in the enterprise. Providing the device with a security certificate as part of provisioning the device binds an identity of the device (for example, a device serial number) to the cryptographic keys, based on information included in the security certificates.

In an embodiment, the enterprise uses a public key infrastructure (PKI) to securely authenticate and manage devices. For example, the enterprise uses a root certificate authority (CA) to establish a chain of trust among various devices of the enterprise. A CA includes a key pair that is bound to a root identity (e.g., the enterprise's legal name) and is managed and made accessible by a server (e.g., centralized network server or a group of servers). The acts as a trusted third party for secure communication, which is trusted by all the devices in the enterprise that engage in authenticated communication. The enterprise uses one or more device authority servers that are used to authenticate devices in the enterprise, and one or more device administrator authority servers used to authenticate entities that reconfigure devices or update device firmware (e.g., a manifest server). The device authority servers, or the device administrator authority servers, or both, act as intermediate CAs, e.g., respectively by generating digital certificates for devices installed in the enterprise's vehicles, or for entities that reconfigure devices or update device firmware. The enterprise also uses one or more additional servers that implement functions to provide a provisioning service, which fully or partially automates management of the provisioning process for the devices in the enterprise.

In an embodiment, the device has a pre-configured unique, non-modifiable identity that is used to associate one or more digital certificates for the device, which can then be used to authenticate communication between the device and other entities associated with the vehicle. For example, the identity can be a serial number, or a combination of a device manufacturer name or number and a serial number. The device includes hardware capable of securely generating, storing, and operating on cryptographic keys. For example, the device can include a trusted platform module (TPM) or a hardware security module (HSM), among others.

The device also includes a provisioning application programming interface (API) and a device management API. In this context, an API refers to one or more software routines that provide a computing interface to enable interactions between multiple software intermediaries. The API specifies the kinds of calls or requests that can be made, how to make them, the data formats that should be used, or the conventions to follow, among others. The one or more software routines for the APIs are implemented using hardware in the device (e.g., using processors or network interface hardware, among others). The provisioning API initiates provisioning by communicating with the provisioning service of the enterprise. The device management API is used to manage firmware and configuration updates of the device, and to deprovision the device. Additionally or alternatively, the device includes security hardware that can interact with the provisioning service.

In an embodiment, the device has an enterprise security certificate associated with the enterprise's root CA, prior to being provisioned. For example, the enterprise can provide its root CA certificate to the device manufacturer, which includes the root CA certificate in firmware installed on devices delivered to the enterprise.

When the device is received by the enterprise, a tracking system used by the enterprise captures the device identity (e.g., by scanning the device label, or manually entering the serial number in a web interface, among others), and notifies the provisioning service about the new device. The provisioning service adds the device's identity as a record in a database of active devices used in vehicles associated with the enterprise.

Following installation in a vehicle, the device is first powered up and booted. By "booted," we mean that the device executes a series of instructions to locate, load, and initialize boot files, which are files that contain data used for executing an operating system on the device. During the boot process, the device (e.g., a processor in the device) determines that the device does not have a digital certificate that is bound to the identity of the device (although the device has the digital certificate for the enterprise provisioning service). Upon making this determination, the device enables the provisioning API, which establishes a communication with the provisioning service of the enterprise. The provisioning service sends its digital certificate to the device, which authenticates the provisioning service's certificate using the certificate of the CA. The provisioning service then commands the device to generate a key pair. Upon receiving the command, the device (e.g., the TPM or HSM in the device) generates a public-private key pair, e.g., a Rivest-Shamir-Adleman (RSA) key pair or Elliptic Curve Cryptography (ECC) key pair, among others. The private key of the key pair is stored securely in secure storage of the device, e.g., within the TPM or HSM. The device generates a certificate signing request (CSR) that includes the public key of the key pair, and sends the CSR to the provisioning service as a response to the command.

Upon receiving the CSR from the device, the provisioning service checks to confirm that the device's identity is present in a record in the database of active devices, or that the device is not already provisioned, or both. If the checks indicate that the device's identity is present in the database of active devices but the device is not provisioned (e.g., the device has been scanned into the system as ready to provision, but has not yet been provisioned), the provisioning service sends the device CSR to the enterprise PKI. For example, the provisioning service sends the CSR to a device authority server. Upon receiving the CSR, the device authority server generates a digital certificate (e.g., an x509 certificate) that binds the device's identity to the device public key that is obtained from the CSR. The device authority server then sends a response to the provisioning service. The response includes the generated digital certificate for the device. In an embodiment, the response also includes a digital certificate (e.g., an x509 certificate) for the device authority server, or for a device administrator server, or both. The digital certificates of the device authority server and the device administrator server are also referred to as intermediate CA certificates.

The provisioning service forwards the device certificate and the intermediate CA certificates to the device. The device authenticates the intermediate CA certificates using the root CA certificate that is pre-installed on the device. The device then authenticates the digital certificate generated for the device using the authenticated certificate of the device authority server that generated the device certificate. Upon successful authentication, the device stores its digital certificate and the intermediate CA certificates in storage memory coupled to the device. The device certificate is subsequently used to authenticate the device during communication with other entities in the vehicle, or within the enterprise. The intermediate CA certificates are used to authenticate digital certificates received from the other entities.

In an embodiment, a device is reprovisioned, during which one or more new cryptographic keys, or new security certificates, are generated for the device. To reprovision a device, a management server of the enterprise sends a deprovision command to the provisioning service, with the deprovision command including the device identity. Upon receiving the deprovision command, the provisioning service deletes the device digital certificate that is stored by the provisioning service. The management server also establishes a communication with the device. Following mutual authentication (e.g., using digital certificates), the management server sends a deprovision command to the device. Upon receiving the deprovision command, a device management API in the device deletes its existing digital certificate and the public-private key pair. The device can then be reprovisioned by generating a new public-private key pair, and following the procedure described in the previous sections.

In an embodiment, a device is decommissioned. This can be the case, for example, when a device reaches the end of its service life. In such cases, a management server of the enterprise notifies the provisioning system, with the notification including the device identity (e.g., serial number). The provisioning service moves the device's identity record from its database of active device records to a database of retired device records, and revokes the device's digital certificate.

In an embodiment, a device that has been provisioned uses the digital certificate generated for the device for authentication during device management. In such cases, for example, when the device boots up, since it already has an associated digital certificate stored in memory coupled to the device, the provisioning API is not enabled, but the device management API is enabled. A device administrator entity (e.g., a remote server managed by the enterprise, or a manifest server or another electronic device local to the vehicle) establishes a communication with the device management API, and mutual authentication takes place. For example, the device authenticates a device administrator server using a corresponding intermediate CA certificate that the device received during provisioning. The device administrator authenticates the device using the device's digital certificate. In an embodiment, mutual authentication is performed using Transport Layer Security (TLS) protocol. In an embodiment, mutual authentication is performed using a secure challenge response protocol. Following mutual authentication, the device administrator entity re-configures device, or updates device firmware, or both, using the device management API.

The subject matter described herein can provide several technical benefits. For instance, embodiments can facilitate authenticated machine-to-machine communication with other entities. Only devices that are registered with the enterprise can be provisioned, thereby preventing spoofing of devices. The disclosed provisioning techniques ensure that only expected devices are deployed in a vehicle: for example, devices intended for another vehicle, or a malicious implant, among others, are not operational in the vehicle. The provisioning techniques are also used to authenticate device administrators. The disclosed techniques also allow a registered device to be reprovisioned, which enables the device to use refreshed cryptographic keys and associated certificates, increasing the security of the vehicle.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., Wi-Fi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from one or more computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computer processor 146 is similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, the sensors 121 include monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processor 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, computer peripherals 132 are similar to the display 312, input device 314, and cursor controller 316 discussed below in reference to FIG. 3. The coupling is wireless or wired. Any two or more of the interface devices may be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the vehicle 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the vehicle 100, or to another AV. This enables the passenger's privacy level to specify which other entities are allowed to receive data about the passenger's actions or other data associated with the passenger.

Figure 2:
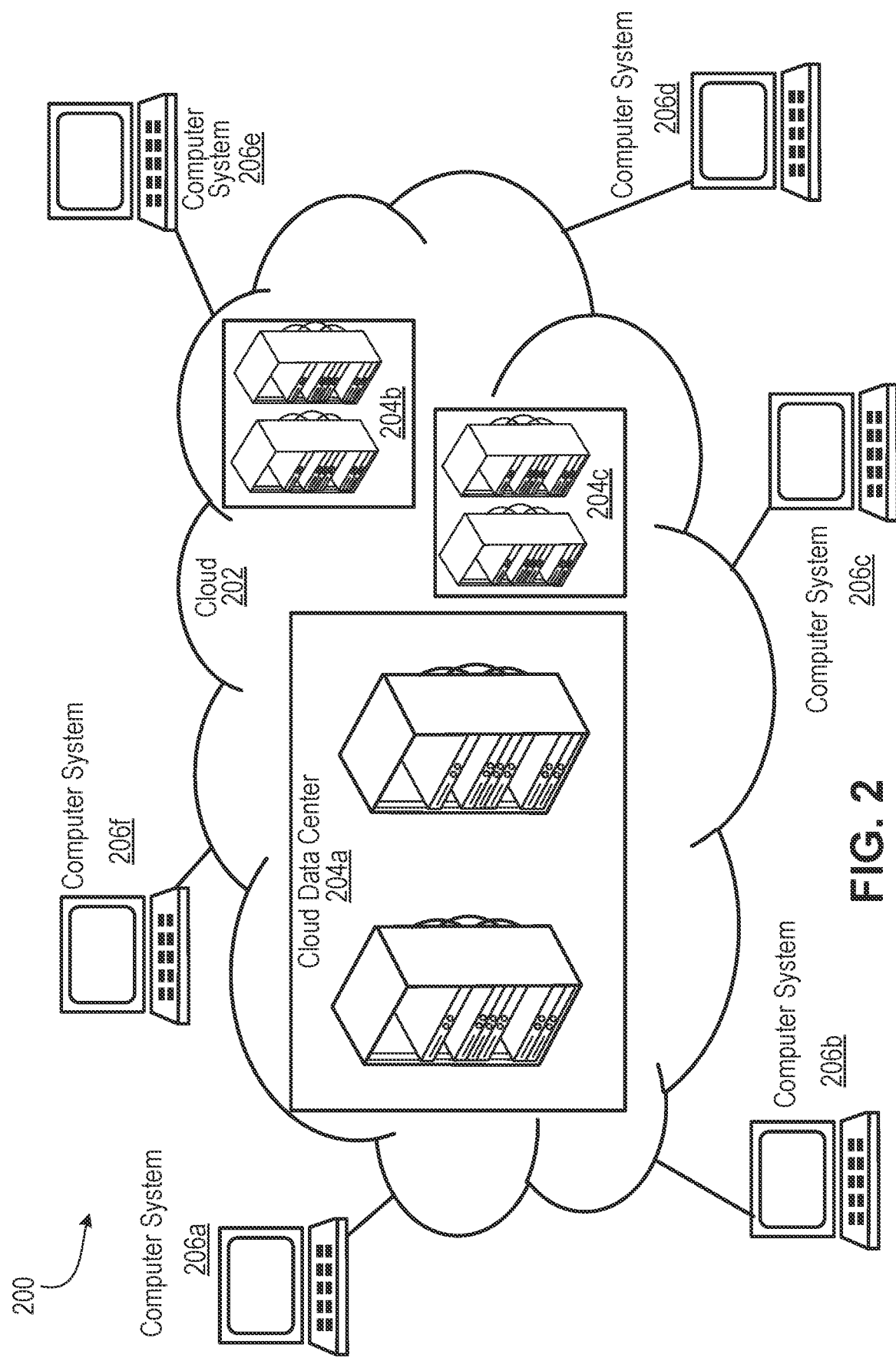
FIG. 2 shows an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
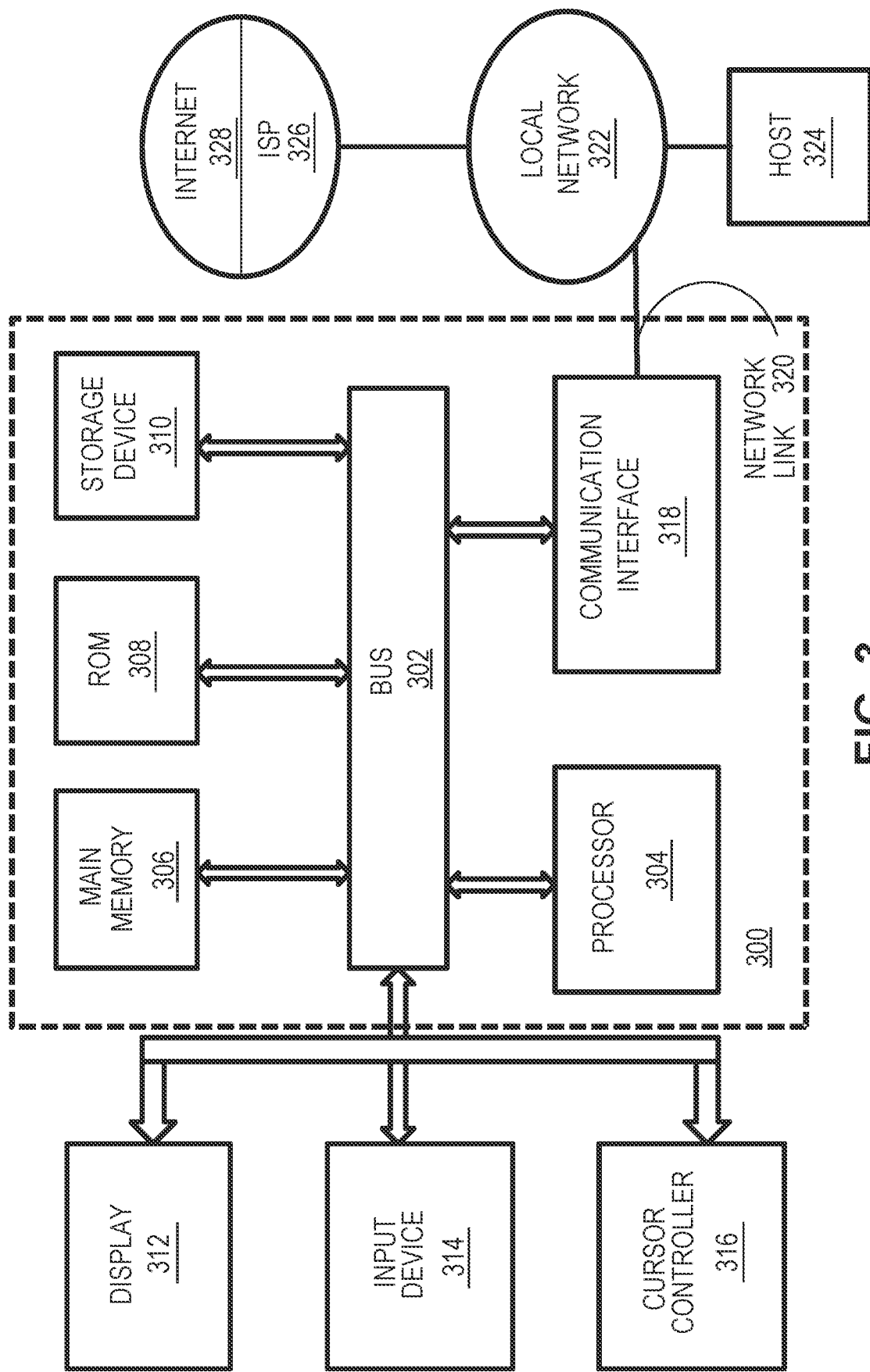
FIG. 3 shows a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
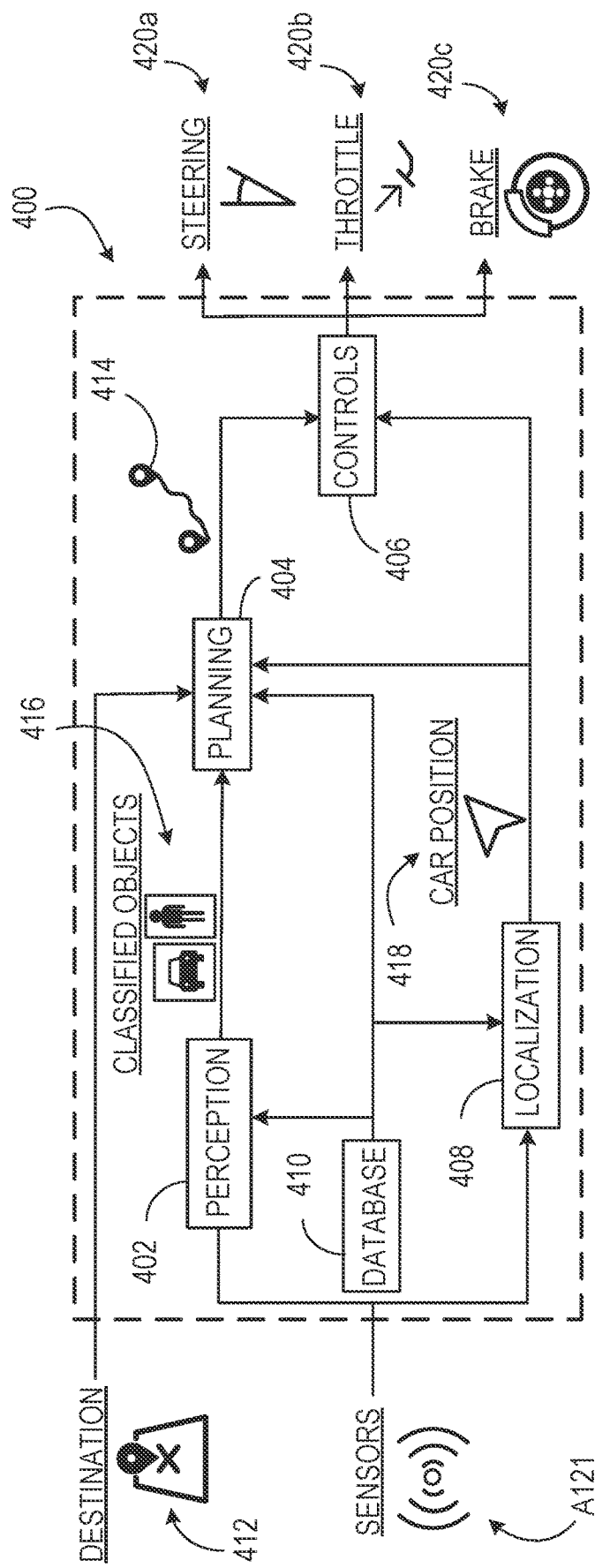
FIG. 4 shows an example architecture for an autonomous vehicle.

FIG. 4 shows an example architecture 400 for an autonomous vehicle (e.g., the vehicle 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the vehicle 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the vehicle 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control module 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

Autonomous Vehicle Inputs

Figure 5:
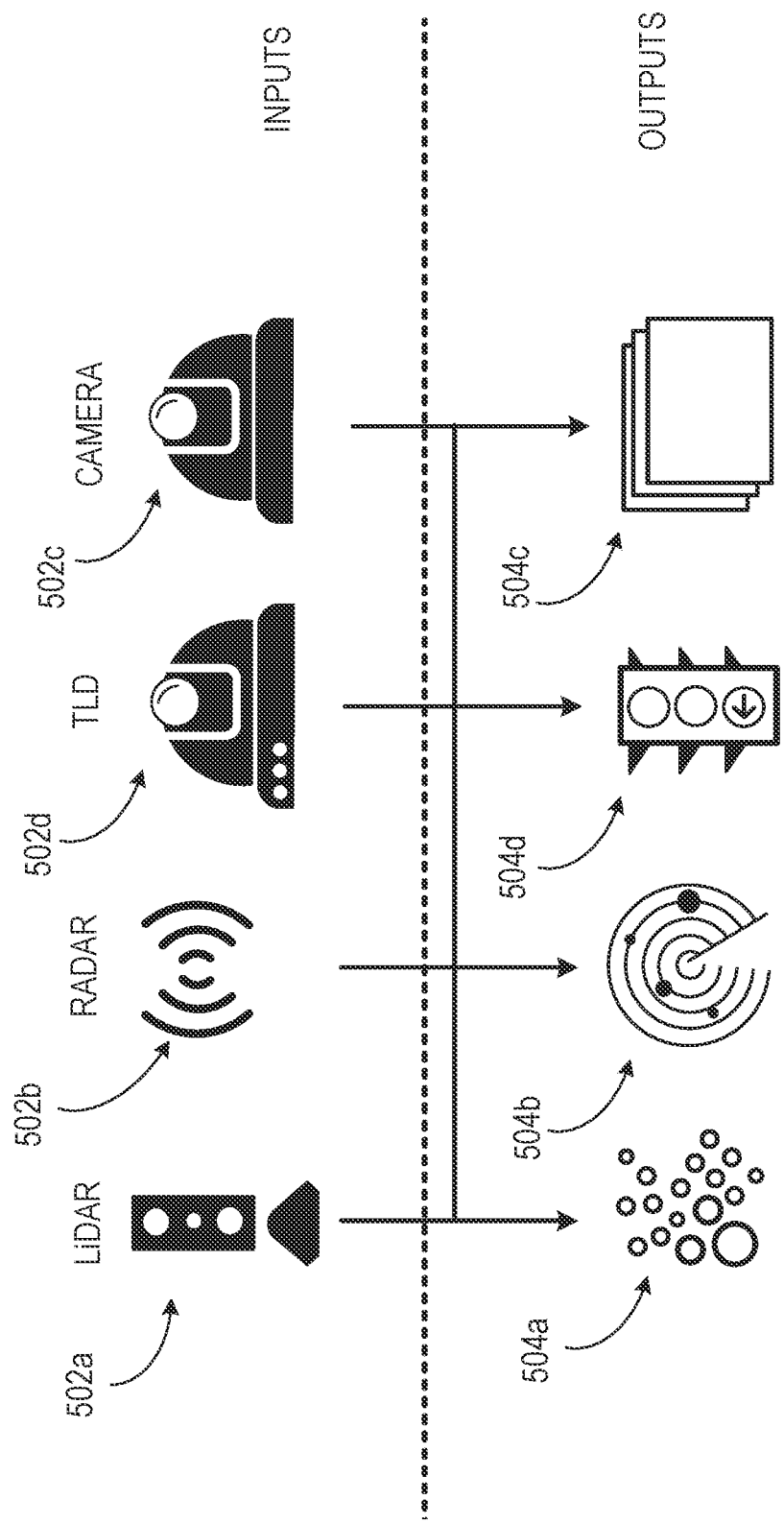
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the vehicle 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
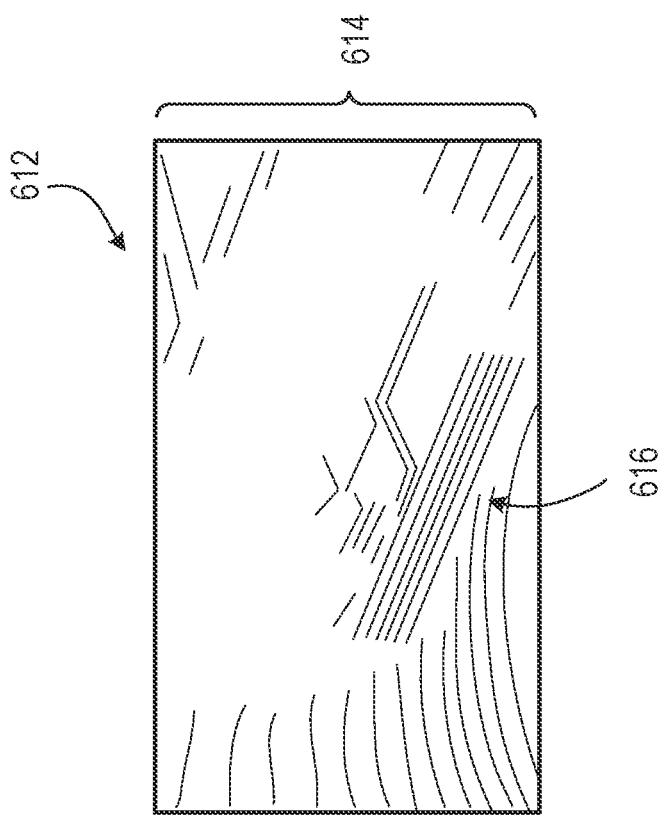
FIG. 6 shows an example of a LiDAR system.
Figure 6:
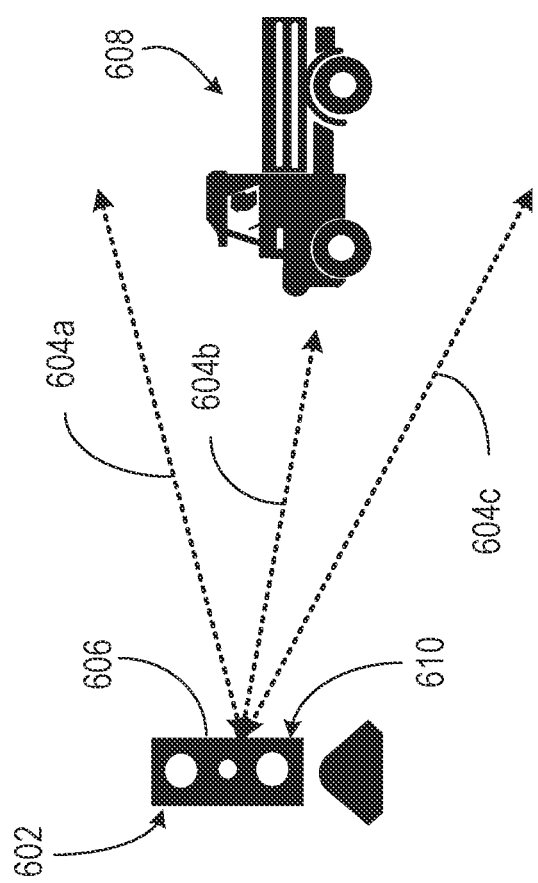

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
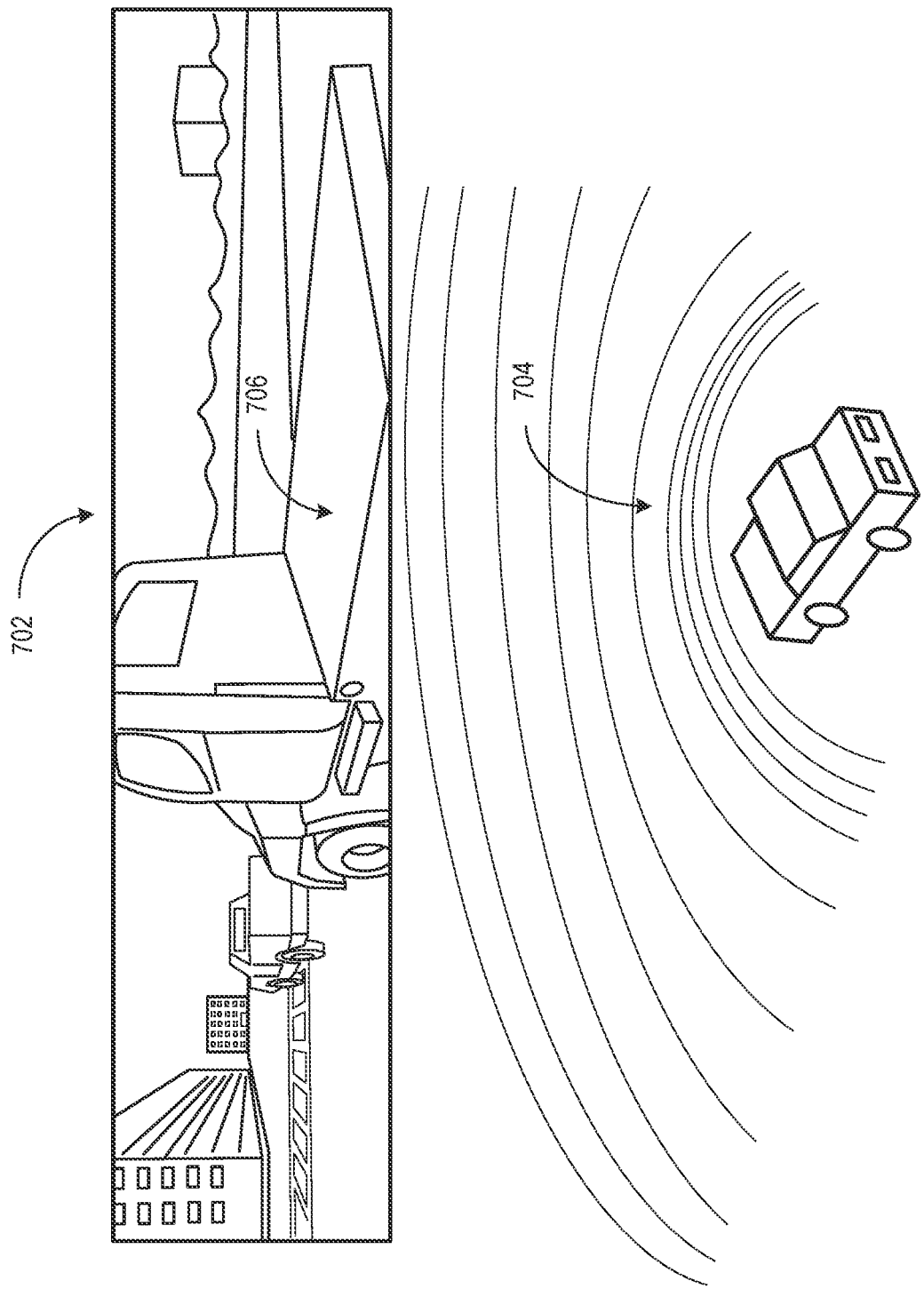
FIG. 7 shows the LiDAR system in operation.

FIG. 7 shows the LiDAR system 602 in operation. In the scenario shown in this figure, the vehicle 100 receives both camera system output 504c in the form of an image 702 and LiDAR system output 504a in the form of LiDAR data points 704. In use, the data processing systems of the vehicle 100 compares the image 702 to the data points 704. In particular, a physical object 706 identified in the image 702 is also identified among the data points 704. In this way, the vehicle 100 perceives the boundaries of the physical object based on the contour and density of the data points 704.

Figure 8:
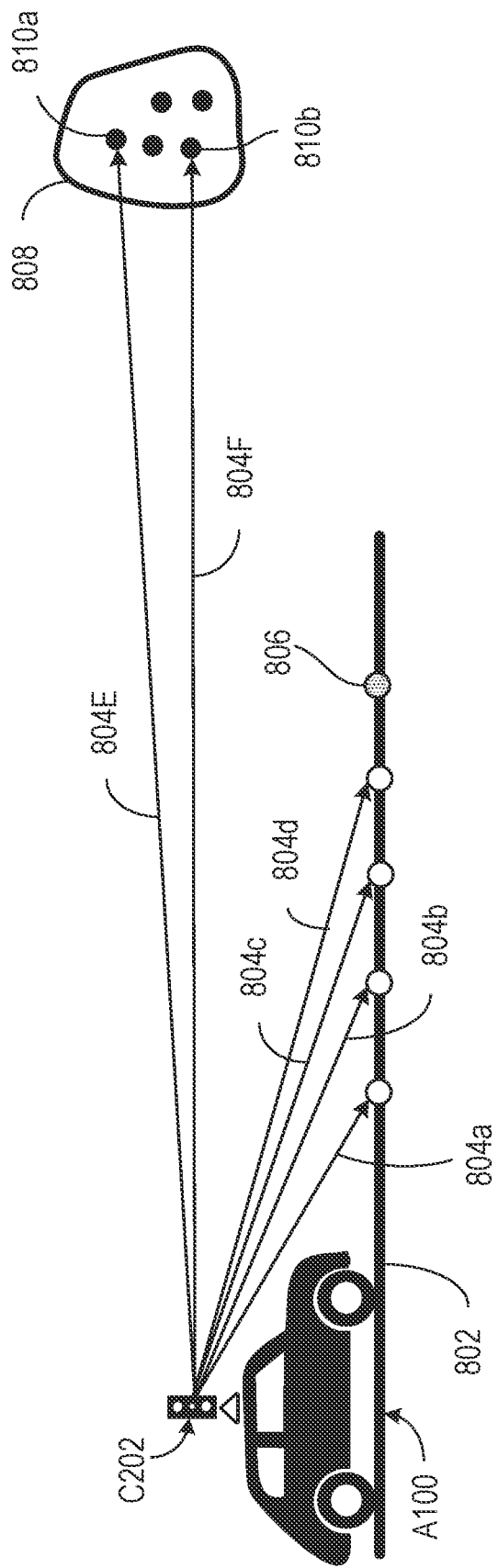
FIG. 8 shows the operation of the LiDAR system in additional detail.

FIG. 8 shows the operation of the LiDAR system 602 in additional detail. As described above, the vehicle 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the vehicle 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the vehicle 100 can determine that the object 808 is present.

Path Planning

Figure 9:
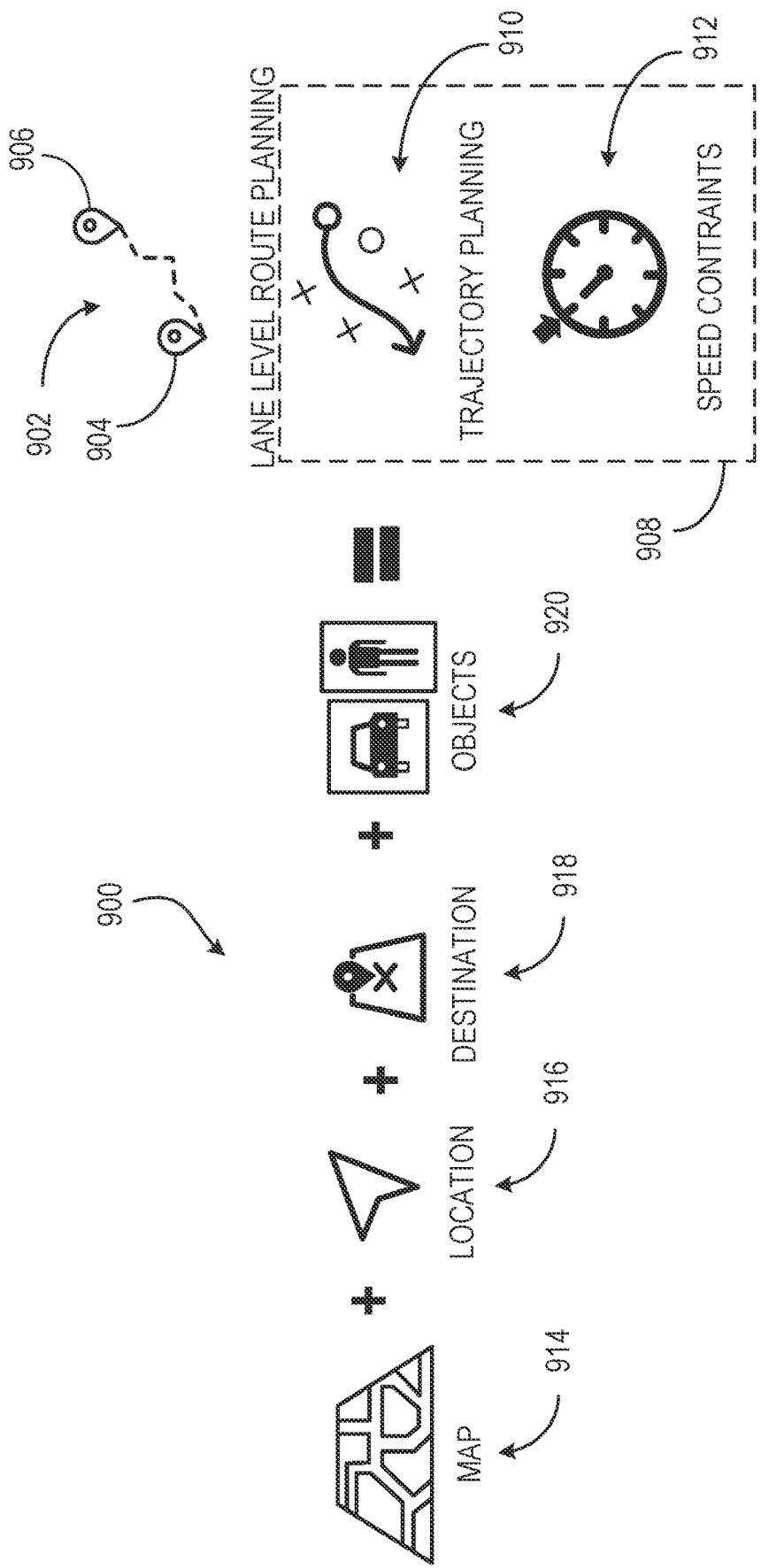
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the vehicle 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
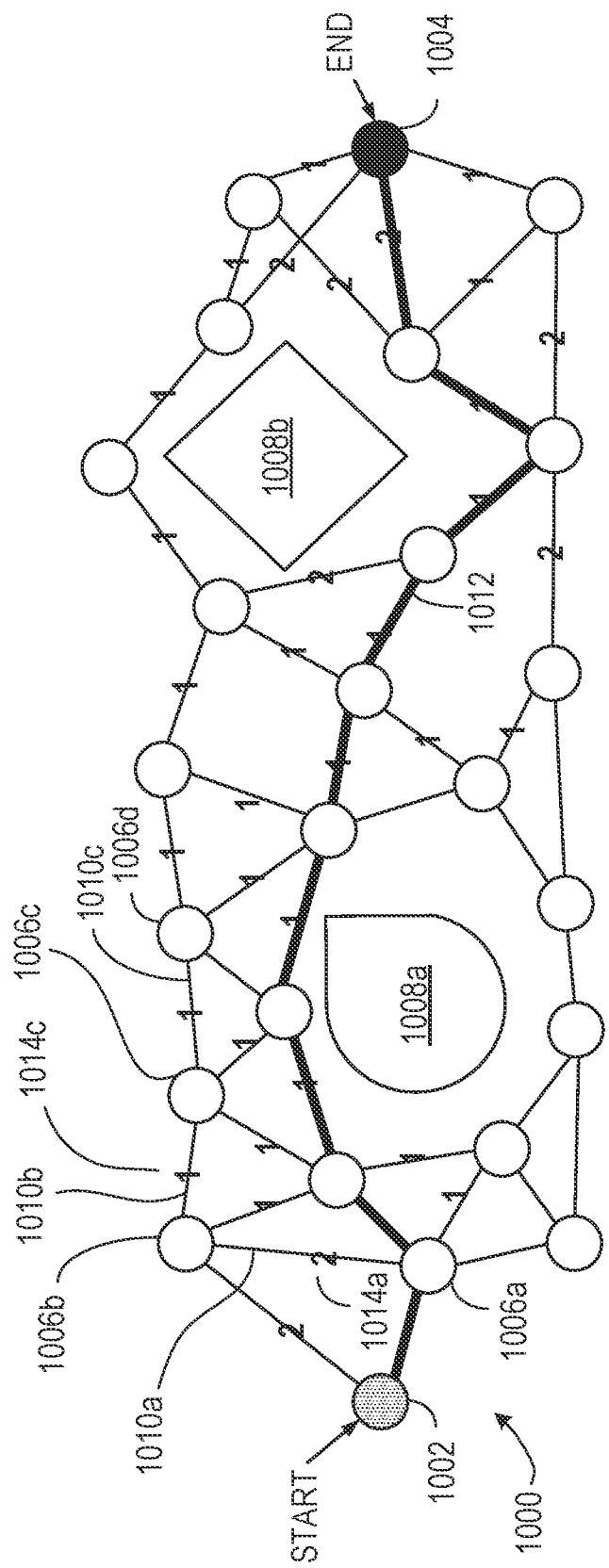
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by a vehicle 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the vehicle 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the vehicle 100, e.g., other automobiles, pedestrians, or other entities with which the vehicle 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for a vehicle 100 to travel between one node 1006a and the other node 1006b, e.g., without having to travel to an intermediate node before arriving at the other node 1006b. (When we refer to a vehicle 100 traveling between nodes, we mean that the vehicle 100 travels between the two physical positions represented by the respective nodes.) The edges 1010a-c are often bidirectional, in the sense that and vehicle 100 travels from a first node to a second node, or from the second node to the first node. In an embodiment, edges 1010a-c are unidirectional, in the sense that an vehicle 100 can travel from a first node to a second node, however the vehicle 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the vehicle 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
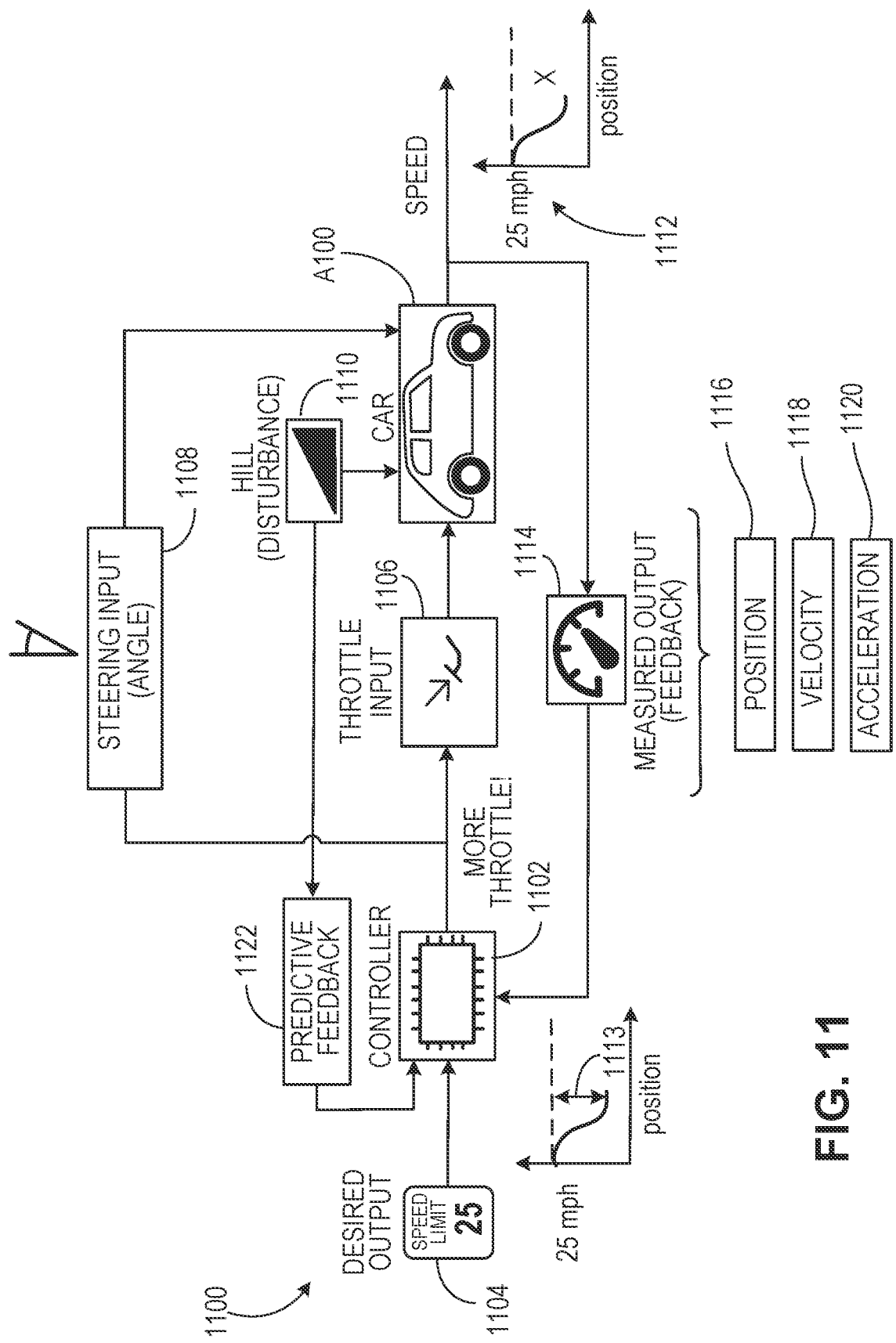
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an vehicle 100, e.g., by engaging the steering pedal, or engaging another throttle control, to achieve the desired output 1104. In some examples, the throttle input 1106 also includes data usable to engage the brake (e.g., deceleration control) of the vehicle 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the vehicle 100 encounters a disturbance 1110, such as a hill, the measured speed 1112 of the vehicle 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the vehicle 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the vehicle 100 detect ("see") a hill, this information can be used by the controller 1102 to prepare to engage the throttle at the appropriate time to avoid significant deceleration.

Figure 12:
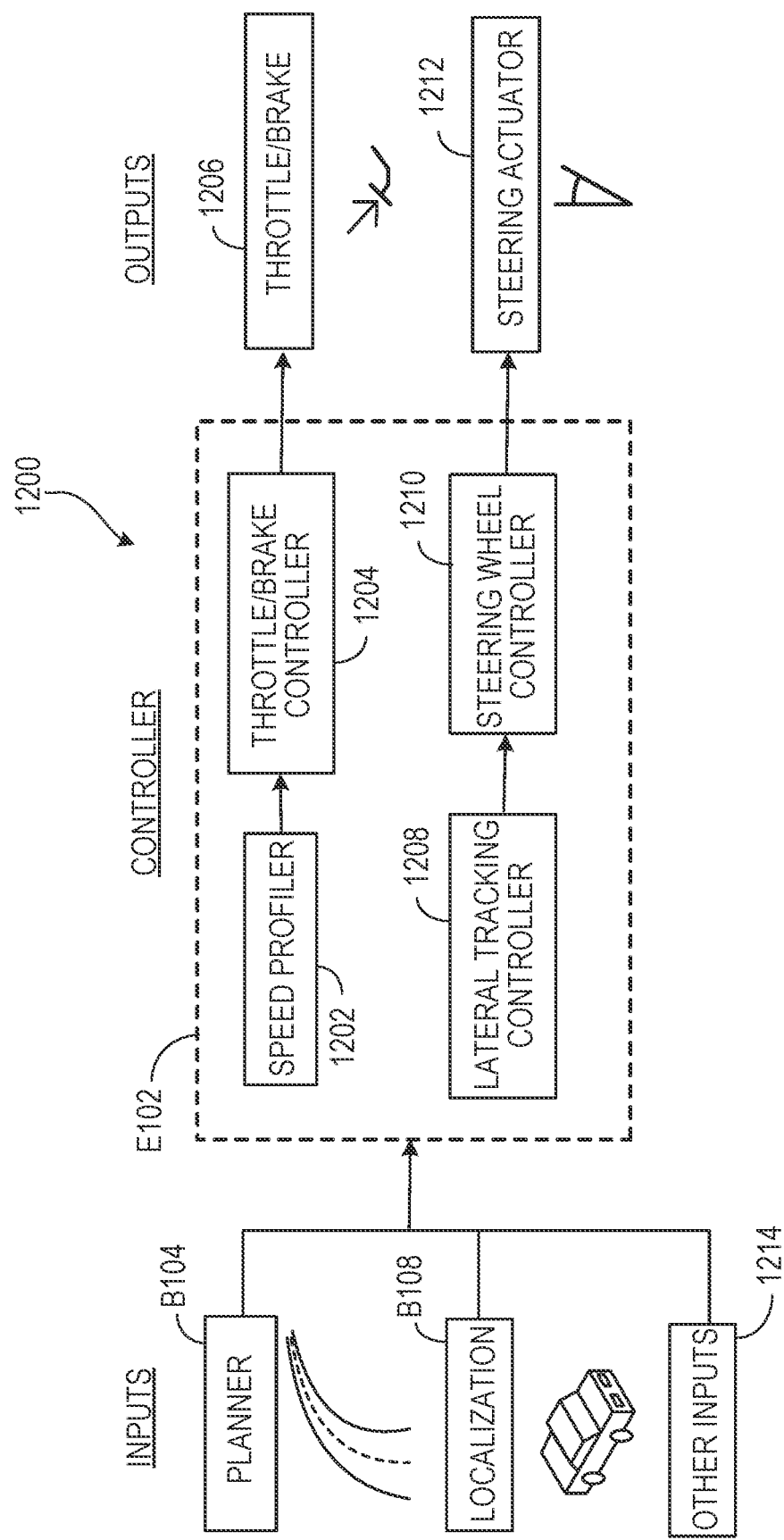
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the vehicle 100 begins operation and to determine which road segment to traverse when the vehicle 100 reaches an intersection. A localization module 408 provides information to the controller 1102 describing the current location of the vehicle 100, for example, so that the controller 1102 can determine if the vehicle 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Device Provisioning and Authentication

Figure 13:
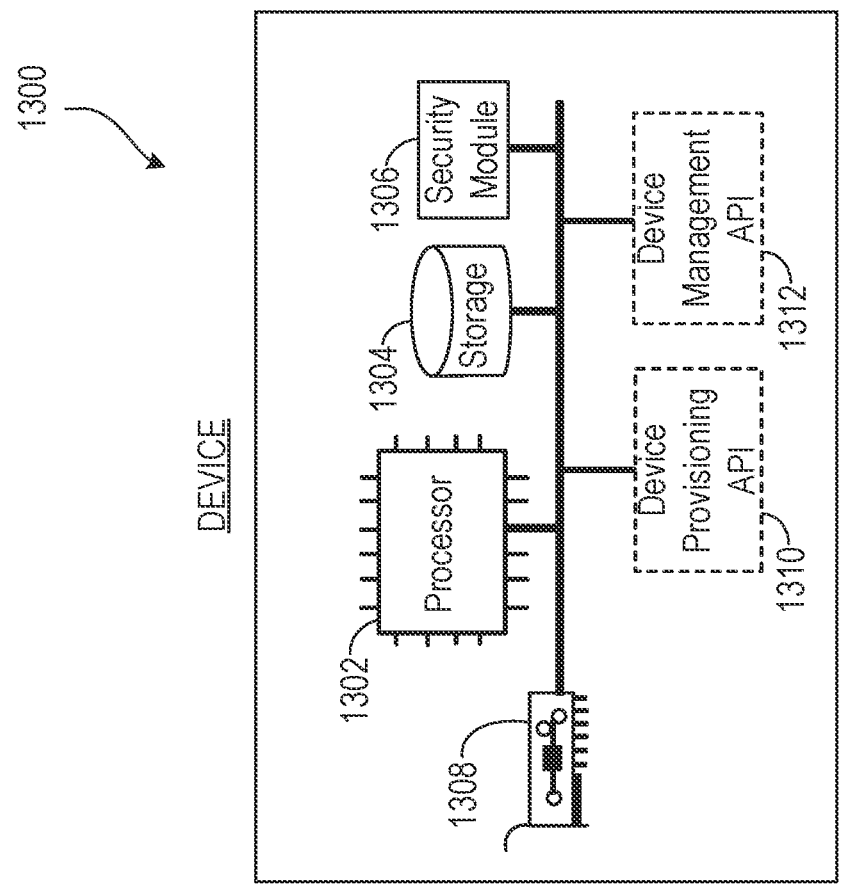
FIG. 13 shows an example of an electronic device that is a component in a vehicle and provisioned using the techniques disclosed herein.

FIG. 13 shows an example of an electronic device 1300 that is a component in a vehicle and provisioned using the techniques disclosed herein. In this context, provisioning a device in a vehicle refers to providing the device with one or more cryptographic keys or security certificates, or both, such that the device can perform authenticated communication with other entities in the vehicle, or with external entities (for example, remote servers) in the enterprise, as described previously. The device 1300 includes one or more computer processors, such as processor 1302; local storage, such as memory storage unit 1304; a security module 1306; and a communications network interface 1306. The processor 1302 executes instructions stored in the local storage to implement a device provisioning API 1310 and a device management API 1312. As noted previously, the provisioning API 1310 initiates the provisioning of the device 1300 by communicating with the provisioning service of the enterprise. The device management API 1312 is used to manage firmware and configuration updates of the device 1300.

In some embodiments, the device 1300 is an example of a component device in the vehicle 100 (FIG. 1). For example, in some cases, the device 1300 is one of the sensors 121 in the vehicle 100, such as one of monocular or stereo video cameras 122, infrared or thermal (or both) spectra, LiDAR 123, RADAR, ultrasonic sensors, time-of-flight (TOF) depth sensors, speed sensors, temperature sensors, humidity sensors, or precipitation sensors. In some cases, the device 1300 is some other electronic component of the vehicle 100, such as one of computer processor 146, communications devices 140, data storage unit 142, memory 144, or devices 101 (e.g., one of steering control 102 or brakes 103, among others).

The device 1300 uses the provisioning techniques disclosed herein to generate a public-private key pair and obtain a digital certificate, e.g., when the device is initially deployed in the vehicle. The digital certificate or security certificate certifies the ownership of the public key by the device, which is the named subject of the certificate. The certificate allows other entities to rely upon signatures or on assertions made by the device about the private key that corresponds to the certified public key. For example, when the device 1300 sends a message signed with the private key (which is known only to the device), the recipient can verify the authenticity of the message (e.g., that the message was indeed signed by the device) by performing cryptographic authentication operations on the message signature using the public key obtained from the certificate. Since the certificate binds the device's identity to the public key, successful verification of the message signature using the public key verifies that the device had signed the message.

In some embodiments, the device 1300, at a time subsequent to its initial provisioning, uses the reprovisioning techniques disclosed herein to update its public-private key pair and obtain a new digital certificate. As part of the provisioning or reprovisioning, the device 1300 also obtains intermediate CA digital certificates corresponding to a device authority of the enterprise or a device administrator authority of the enterprise, or both. The device 1300 uses its digital certificate to authenticate itself to other devices in the vehicle, or to other entities outside the vehicle (e.g., computer peripherals 132 or cloud server 136), during communication with these other devices or entities. The device 1300 uses the intermediate CA digital certificate(s) to authenticate the digital certificates of the other devices or entities during such communication.

In some embodiments, the device 1300 uses the security module 1306 to securely generate its public-private key pair, or to store its private key, or both. In some embodiments, the private key never leaves the security module 1306. As described previously, in some embodiments, the security module 1306 is a trusted platform module (TPM) or a hardware security module (HSM). In this context, a TPM or a HSM is a specialized chip that safeguards and manages digital keys, performs encryption and decryption functions for digital signatures, strong authentication and other cryptographic functions. The TPM or HSM generates the public-private key pair and stores the keys and/or other security information specific to the host system for hardware authentication.

The one or more other devices or entities with which the device 1300 communicates for provisioning, reprovisioning, or authenticated communication in some embodiments, include servers and devices associated with the enterprise that is also associated with the vehicle in which the device 1300 is deployed. In this context, "associated with" refers to owned, operated, or managed by, or any combination of these. As described previously, in some embodiments, the enterprise is associated with a plurality of vehicles, including the vehicle in which the device 1300 is deployed.

Figure 14:
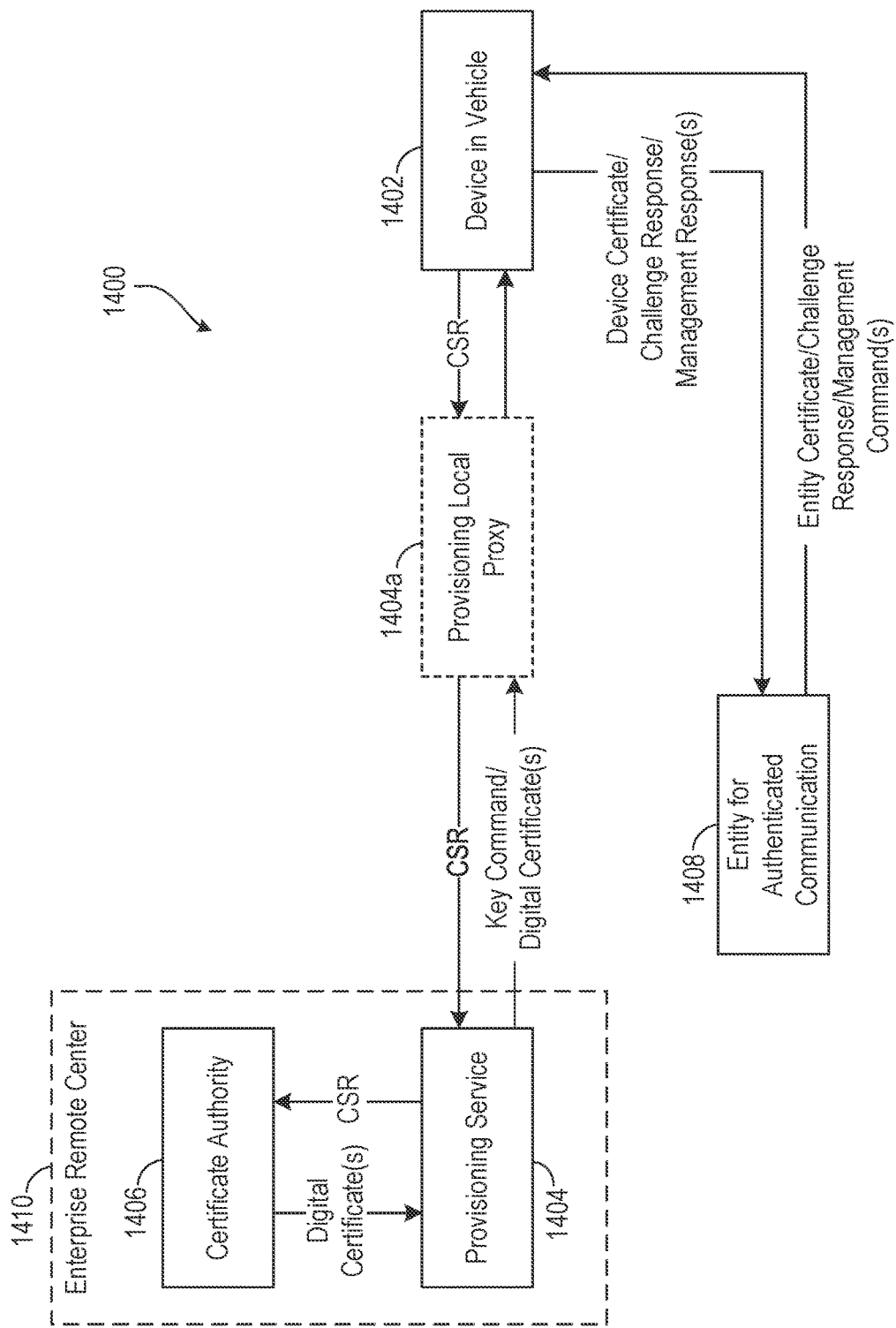
FIG. 14 shows an example of a system for provisioning and authenticated communication of an electronic device that is a component in a vehicle, using the techniques disclosed herein.

FIG. 14 shows an example of a system 1400 for provisioning and authenticated communication of an electronic device 1402 that is a component in a vehicle, using the techniques disclosed herein. The system 1400 includes, apart from the electronic device 1402, a provisioning service 1404, a certificate authority 1406, and an entity for authenticated communication 1408. In some embodiments, the system 1400 optionally includes a provisioning local proxy service 1404a that is a proxy for the provisioning service 1404 and is positioned in local proximity to the device 1402. In some embodiments, the system 1400 includes an enterprise remote center 1410, which is associated with the enterprise and includes the provisioning service 1404 or the certificate authority 1406, or both.

In some embodiments, the device 1402 is an example of the device 1300. For example, in some cases, the device 1402 is one of the sensors 121 in the vehicle 100, such as one of monocular or stereo video cameras 122, infrared or thermal (or both) spectra, LiDAR 123, RADAR, ultrasonic sensors, time-of-flight (TOF) depth sensors, speed sensors, temperature sensors, humidity sensors, or precipitation sensors. In some cases, the device 1402 is some other electronic component of the vehicle 100, such as one of computer processor 146, communications devices 140, data storage unit 142, memory 144, or devices 101 (e.g., one of steering control 102 or brakes 103, among others). The following sections accordingly describe, without loss of generality, functions and operations of the device 1402 with respect to the device components described for the device 1300.

In some embodiments, the device 1402 is configured with a unique, non-modifiable identity, e.g., at the time of the device manufacture. For example, the identity can be a device serial number. As another example, the identity can be a combination of a device manufacturer name (or unique manufacturer number) and a device serial number. This is useful, for example, in cases where different manufacturers produce devices having the same serial number.

In some embodiments, a digital certificate associated with the enterprise's root CA is installed in the device 1402, prior to the device 1402 being provisioned. For example, the enterprise can provide its root CA certificate to the device manufacturer, which includes the root CA certificate in firmware installed in the device 1402 (and potentially installed in other devices as well from the manufacturer) prior to delivering the device 1402 to the enterprise.

In some embodiments, the provisioning service 1404 is implemented on one or more servers associated with the enterprise. Similarly, the certificate authority 1406 is implemented on one or more servers associated with the enterprise. In some embodiments, the certificate authority 1406 represents a device authority associated with the enterprise that is used to authenticate devices. Additionally or alternatively, in some embodiments, the certificate authority 1406 represents a device administrator authority associated with the enterprise that is used to authenticate entities (e.g., entity 1408, which can be a manifest server) that reconfigure devices or update device firmware. In some embodiments, the certificate authority acts as an intermediate CA that generates digital certificates for the device 1402, or for the entity 1408, or both. In some embodiments, the provisioning service 1404 or the certificate authority 1406, or both, are located in a remote centralized location of the enterprise, e.g., in an enterprise datacenter.

In some embodiments, the system 1400 includes a root CA associated with the enterprise that is used as the root of the authentication chain of trust for the enterprise. For example, in such cases, a public key of the root CA is known to all devices and entities associated with the enterprise (e.g., the public key is preinstalled in the devices and entities at the time of deployment for operations in the enterprise).

The device 1402 communicates with the provisioning service 1404 to obtain a digital certificate. In some embodiments, the device 1402 communicates directly with the provisioning service 1404 using a network connection established through the network interface in the device 1402 (e.g., similar to network interface 1308 in embodiments where the device 1402 is similar to the device 1300). In some embodiments, the device 1402 communicates with a provisioning local proxy 1404a that serves as a frontend to the provisioning service 1404 and is positioned proximate to the vehicle in which the device 1402 is deployed. For example, the provisioning local proxy 1404a can be implemented in a technician's laptop that is coupled (e.g., through a wired or wireless connection) to the processors in the vehicle.

In some embodiments, communications between the device 1402 and the entity 1408 is authenticated using respective digital certificates. This can be useful, for example, to verify that only entities 1408 authorized by the enterprise (e.g., a manifest server) can reconfigure the device 1402, or that only devices associated with the enterprise can be configured with functionality provided by the enterprise, or both. Communication by the device 1402, for provisioning and/or authentication, with one or more of the provisioning service 1404, the certificate authority 1406, or the entity 1408, among others, are described in the following sections with reference to the message sequence diagrams FIGS. 15A-15C.

Figure 15A:
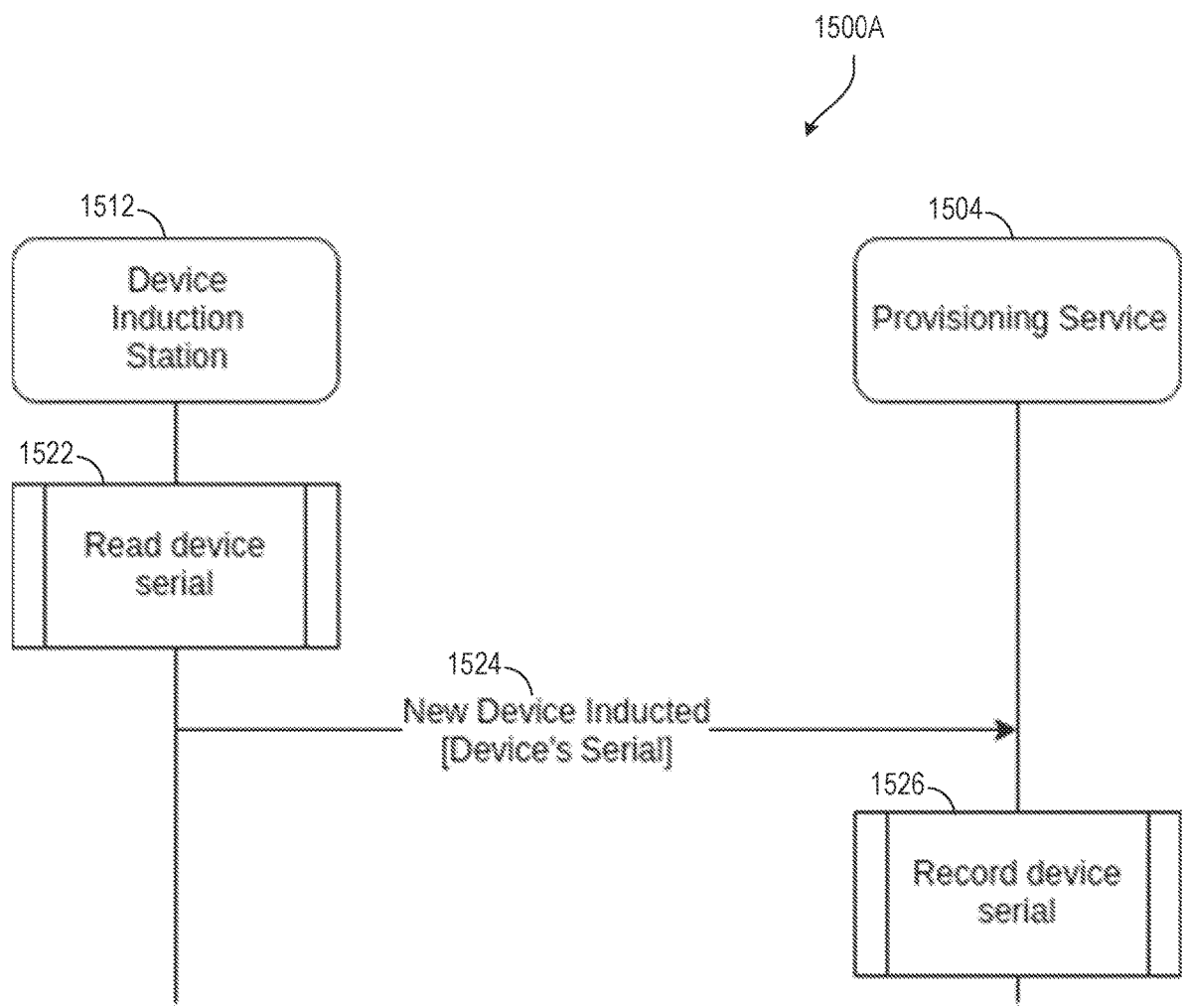
FIGS. 15A, 15B and 15C show examples of message sequence diagrams associated with provisioning an electronic device that is a component in a vehicle, using the techniques disclosed herein.
Figure 15B:
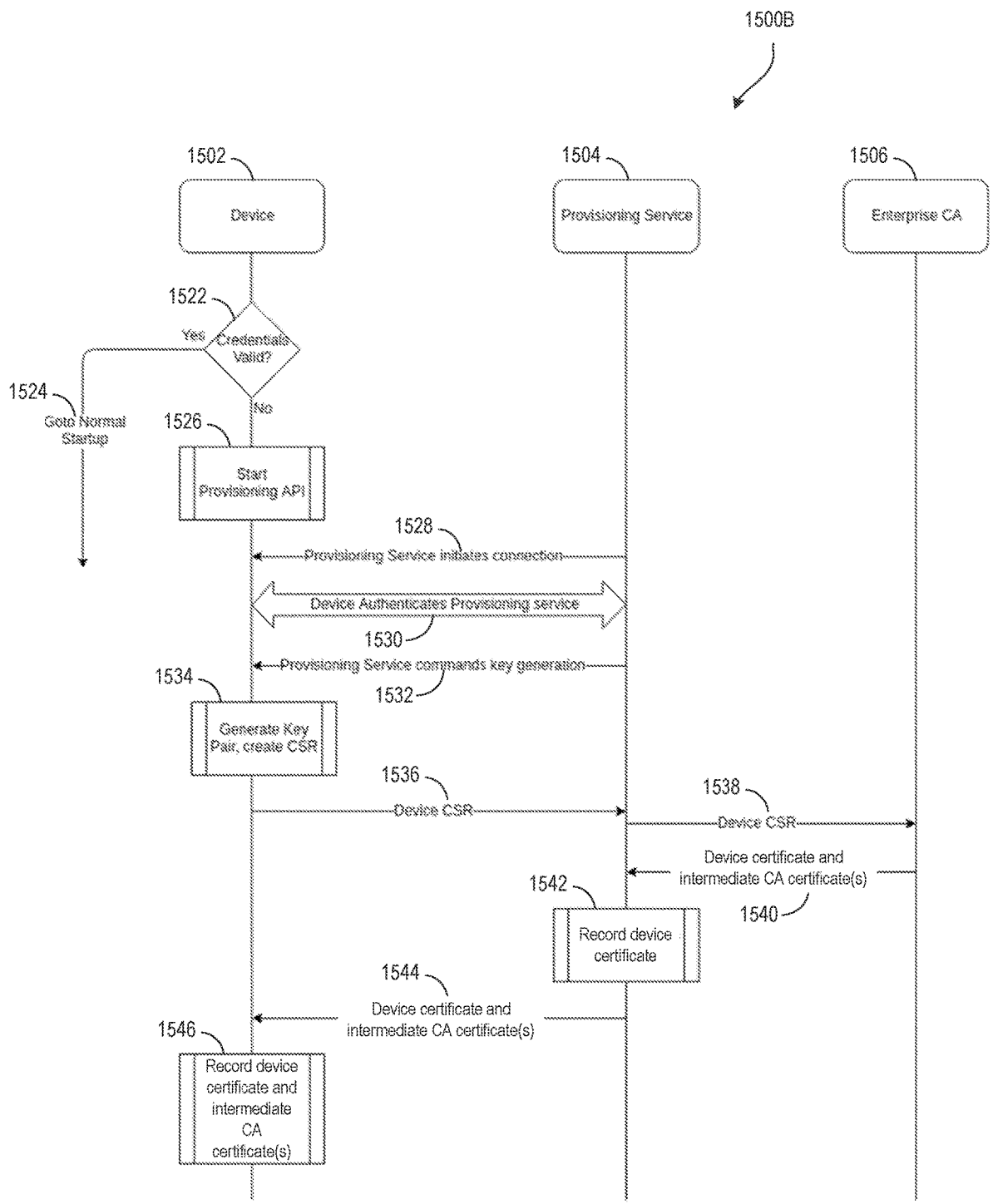
Figure 15C:
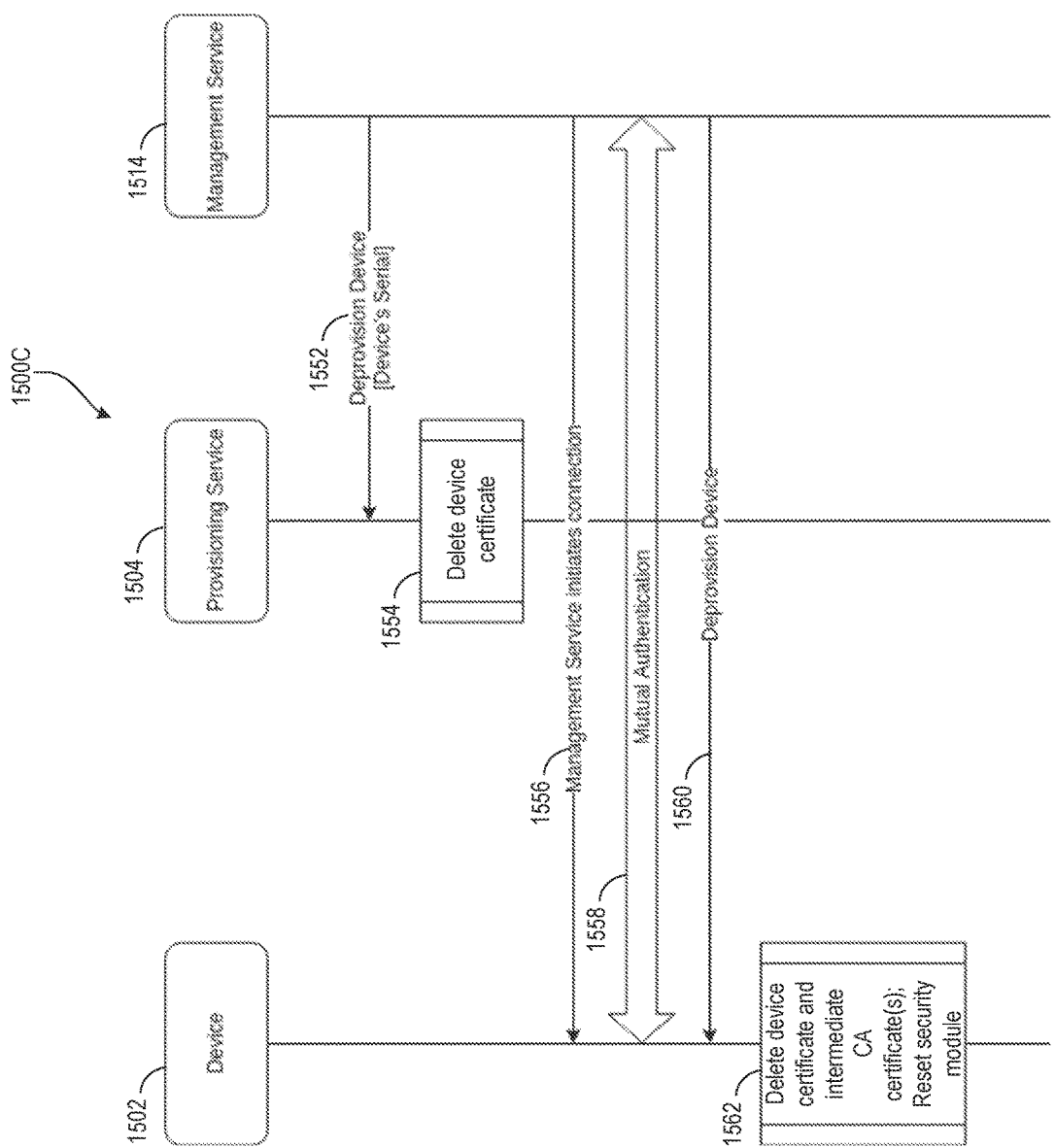

FIGS. 15A, 15B and 15C show examples of message sequence diagrams 1500A, 1500B and 1500C, respectively, associated with provisioning an electronic device that is a component in a vehicle, using the techniques disclosed herein. In some embodiments, the message sequence diagrams 1500A, 1500B and 1500C represent exchange of communication between one or more of the device 1402, the provisioning service 1404, and the certificate authority 1406. In such embodiments, in the FIGS. 15A-15C, the device 1502 is similar to the device 1402; the provisioning service 1504 is similar to the provisioning service 1404; and the enterprise CA 1506 is similar to the certificate authority 1406. Accordingly, the descriptions of the message sequence diagrams 1500A, 1500B and 1500C include references to the system 1400. The message sequence diagrams 1500A, 1500B and 1500C also include communication exchange with other entities in the enterprise system, such as device induction station 1512, and enterprise management service 1514.

The message sequence diagram 1500A in FIG. 15A shows exchange of communication between the provisioning service 1504 and a device induction station 1512 associated with the enterprise. In some embodiments, the communication shown in the message sequence diagram 1500A takes place when a component device of a vehicle, e.g., device 1502, is inducted, e.g., initially deployed, in the enterprise. This can be the case, for example, when the device 1502 is received by the enterprise for installation as a component in a vehicle associated with the enterprise.

As shown in FIG. 15A, when the component device is received at the enterprise (e.g., from the manufacturer or vendor), device induction station 1512 captures the device identity, e.g., by reading the device serial number (1522) by scanning or manually entering the serial number in a web interface. In some embodiments, the device induction station 1512 is part of a tracking system of the enterprise. As noted previously, in some embodiments, the device identity is a combination of the device manufacturer name (or some other identifying information, such as a unique manufacturer number) and device serial number.

After capturing the device identity, the device induction station 1512 sends a notification to the provisioning service 1506 that a new device has been inducted (1524). The notification includes the device identity, e.g., the device serial number, determined by the device induction station 1512. The provisioning service 1506 records the device identity in a database of active devices used in vehicles associated with the enterprise, e.g., by adding the device serial number as a record in the database (1526).

Following installation in a vehicle, when the device is first powered up and booted, the device (e.g., a processor in the device) determines that the device does not have a digital certificate. Upon making this determination, the device enables the provisioning API, which establishes a communication with the provisioning service of the enterprise.

The message sequence diagram 1500B in FIG. 15B shows exchange of communication between the device 1502, provisioning service 1504 and enterprise CA 1506. In some embodiments, the communication shown in the message sequence diagram 1500B takes place when device 1502 is provisioned for use in the enterprise, e.g., by generating a cryptographic public-private key pair and obtaining a digital certificate that securely binds the device identity to the public key of the key pair. The key pair and the corresponding certificate are subsequently used by the device 1502 for authenticated communication with other devices or entities associated with the enterprise, where the authenticated communication involves the use of security protocols, described herein.

As shown in FIG. 15B, when the device 1502 boots up, the device checks whether it has valid credentials (1522). For example, the device 1502 checks whether it has a current key pair (e.g., stored in the security module 1306) and a corresponding digital certificate that has not expired or been revoked. If the device determines that it has valid credentials, then the device performs normal startup (1524). For example, the device 1502 completes boot up without running its device provisioning API 1310 and proceeds to perform regular functions, such as sensor data collection, firmware update, or reconfiguration, among others. In some embodiments, the regular functions involve authenticated communication with other devices or entities in the vehicle in which the device is deployed, or with external devices or entities associated with the enterprise.

If the device 1502 determines that the device does not have a valid credentials, then the device enables its device provisioning API (1526). This can be the case, for example, when the device is first powered up and booted for the first time following installation in the vehicle, or the enterprise CA 1506 has revoked the device's digital certificate, such that the device 1502 has to be reprovisioned. A communication connection is established between the device provisioning API and the provisioning service 1504 (1528). The device 1502 authenticates the provisioning service 1504 (1530). For example, in some embodiments, the provisioning service 1504 sends its digital certificate to the device 1502, which authenticates the provisioning service's certificate using a challenge-response mechanism and the root CA certificate that is pre-configured in the device 1502. The authentication can involve security protocols such as a Transport Layer Security (TLS) protocol or a Needham-Schroeder protocol. As a general detailed example, in some embodiments, the device 1502 obtains the signature of the root CA that is included in the provisioning service's certificate; determines the public key of the root CA from the root CA certificate; and verifies, using the public key, that the signature of the root CA included in the provisioning service's certificate is indeed signed by the root CA. The device then sends a cryptographic challenge to the provisioning service 1504, to which the provisioning service sends a response that is signed using the provisioning service's private key. The device 1502 verifies the signature in the response using the public key of the provisioning service 1504 that is obtained from the provisioning service's certificate. If the signature is verified, then the provisioning service 1504 is successfully authenticated.

Once the provisioning service 1504 is successfully authenticated, the provisioning service 1504 sends instructions to the device 1502, which commands the device to generate a key pair (1532). Upon receiving the command, the device 1502 (e.g., the security module 1306 in the device) generates a public-private key pair, and also generates a certificate signing request (CSR) (1534). The CSR includes the public key of the key pair, while the private key of the key pair is stored securely in the secure storage of the device, e.g., within the security module 1306. The device 1502 then sends the CSR to the provisioning service 1504 as a response to the key generation command (1536).

Upon receiving the CSR from the device 1502, the provisioning service 1504 checks to confirm that the device's identity is present in a record in the database of active devices, or that the device 1502 is not already provisioned, or both. If the checks are successful, the provisioning service 1504 sends the device CSR to the enterprise CA 1506 (1538). As noted previously, in some embodiments, the enterprise CA is a device authority server.

Upon receiving the CSR, the device authority server generates a digital certificate for the device. The digital certificate, which is signed by the private key of the enterprise CA 1506, binds the device's identity to the public key of the device, which the enterprise CA obtains from the CSR. The enterprise CA 1506 then sends a response to the provisioning service 1504 (1540). The response includes the generated digital certificate for the device. In some embodiments, the response also includes one or more intermediate CA certificates, e.g., a digital certificate for the enterprise CA 1506, or for a device authority server (if distinct from the enterprise CA 1506), or for a device administrator server, or any suitable combination of these. In some embodiments, the digital certificate for the device, or the intermediate CA certificates, or both, are x509 certificates. However, other certificate formats are also possible. For example, in some embodiments, the digital certificate for the device, or the intermediate CA certificates, or both, are Simple public key infrastructure (SPKI) certificates. In some embodiments, the digital certificate for the device, or the intermediate CA certificates, or both, are OpenPGP certificates.

The provisioning service 1504 records the device certificate received from the enterprise CA 1506 (1542). For example, in some embodiments, the provisioning service stores a local copy of the device certificate, linking the local copy to the record of the device identity stored in the database. The provisioning service 1504 then forwards the device certificate and the one or more intermediate CA certificates to the device 1502 (1544).

The device 1502 authenticates the one or more intermediate CA certificates using the root CA certificate that is pre-configured on the device. Upon successfully authenticating the intermediate CA certificates, the device 1502 obtains the public key of the enterprise CA 1506 from the corresponding enterprise CA certificate, and then authenticates the device certificate generated by the enterprise CA 1506 using the public key of the enterprise CA, following standard certificate authentication protocols. Upon successful authentication, the device 1502 stores its digital certificate and the one or more intermediate CA certificates in storage memory coupled to the device (1546). The device 1502 is now provisioned for authenticated communication in the enterprise environment.

The message sequence diagram 1500C in FIG. 15C shows exchange of communication between the device 1502, provisioning service 1504 and enterprise management service 1514. In some embodiments, the communication shown in the message sequence diagram 1500C takes place when the enterprise management service 1514 deprovisions device 1502, e.g., by revoking the device's digital certificate. This can be the case, for example, when the device's keys have been compromised, or to follow enterprise policy that requires devices and entities in the enterprise to refresh their keys and digital certificates from time to time, to enhance security. If the device 1502 remains in the enterprise system for use subsequent to the deprovisioning, the device 1502 is reprovisioned as described with respect to the message sequence diagram 1500A in FIG. 15A. In some embodiments, the communication shown in the message sequence diagram 1500C takes place when the enterprise management service 1514 decommissions device 1502, e.g., by revoking the device's digital certificate. This can be the case, for example, when device 1502 reaches the end of its service life. In such cases, following the decommissioning, the device 1502 is removed from regular use in the enterprise system. The following sections describe the message sequence diagram 1500C with reference to deprovisioning device 1502. However, it is to be understood that the message sequence diagram 1500C is similarly applicable to decommissioning device 1502.

To deprovision device 1502, management service 1514 sends a deprovision command (1552) to the provisioning service 1504, with the deprovision command including the device identity (e.g., device serial number). In some embodiments, the management service 1514 represents one or more management servers of the enterprise (e.g., located at the enterprise remote center 1410). Upon receiving the deprovision command, the provisioning service 1504 deletes the device digital certificate that is stored by the provisioning service with the device identity (1554). In some embodiments, the provisioning service 1504 also moves the device's identity record from its database of active device records to a database of retired device records.

The management service 1514 also establishes a connection with the device 1502. The device 1502 and the management service mutually authenticate each other (1558). For example, in some embodiments, the management service 1514 sends its digital certificate to the device 1502, and the device 1502 and the management service authenticate one another using the other's digital certificate and a challenge-response mechanism, as described previously.

Following mutual authentication, the management service sends a deprovision command to the device (1560). Upon receiving the deprovision command, device management API in the device 1502 (e.g., device management API 1312) deletes its existing digital certificate and the public-private key pair that are stored in the device, e.g., in security module 1306 of the device (1562). In some embodiments, the device management API also deletes the enterprise CA digital certificates that were stored by the device. The device management API then resets the security module, e.g., by resetting one or more cryptographic counters that are used for key generation, performing garbage collection in the security module memory, among other suitable functions.

Example Processes for Device Provisioning and Authentication

Figure 16:
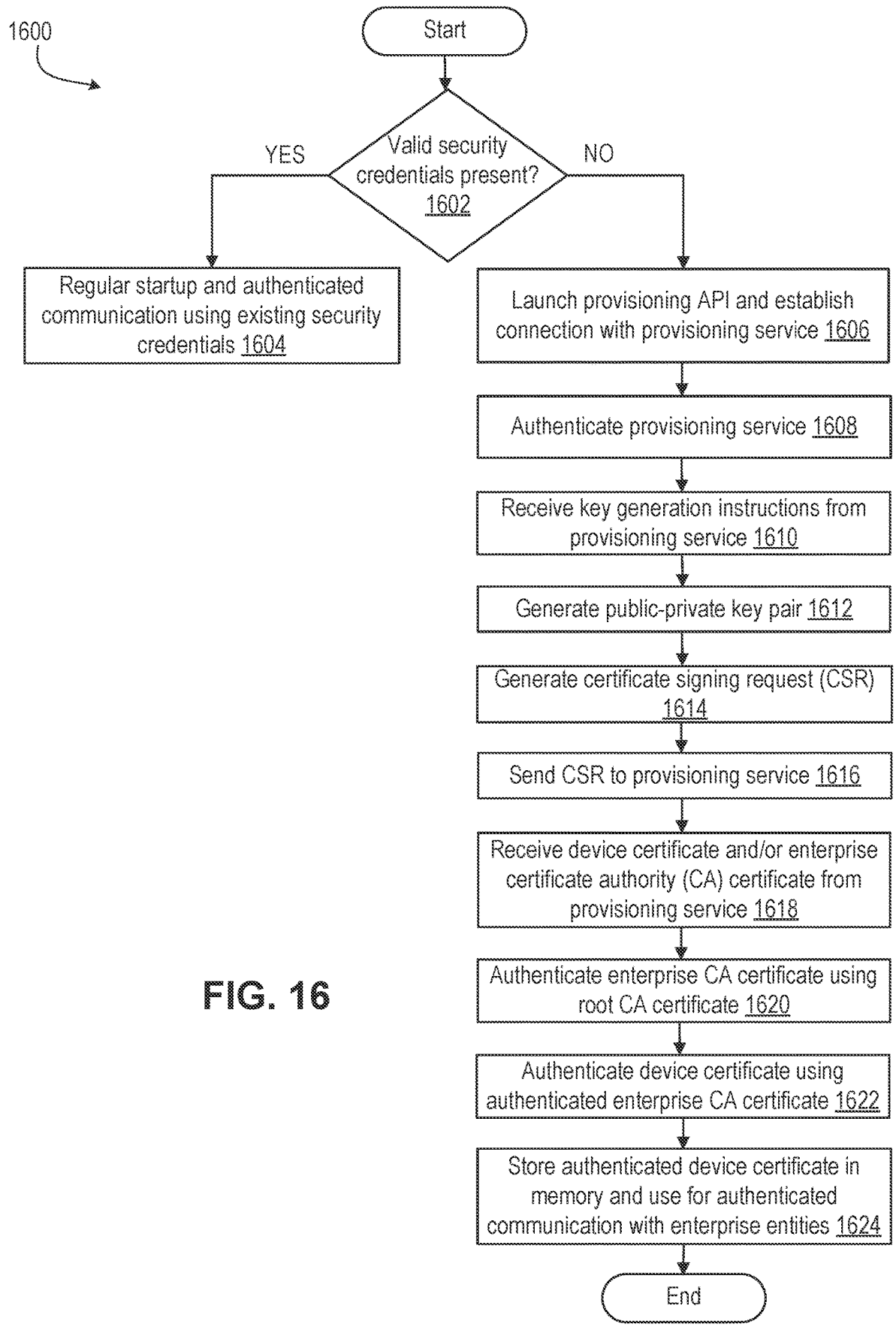
FIG. 16 shows an example process for provisioning an electronic device that is a component in a vehicle associated with an enterprise.

FIG. 16 shows an example process 1600 for provisioning an electronic device that is a component in a vehicle associated with an enterprise. In some embodiments, the process 1600 is performed by the device 1402 that is deployed in a vehicle associated with an enterprise to obtain security credentials (e.g., public-private key pair or digital certificate) for authenticated communication with other devices and entities that are associated with the enterprise system. Accordingly, the process 1600 is described in the following sections with respect to the device 1402 and the system 1400. However, the process 1600 can also be performed by other devices. As described previously, in some embodiments, the device 1402 is similar to the device 1300. Accordingly, in describing the process 1600, hardware components and functions of the device 1402 are described with reference to the hardware components and functions of the device 1300.

In the process 1600, upon booting up, the device checks whether valid security credentials are present in the device (1602). For example, the device 1402 checks whether it has a current key pair (e.g., stored in the security module 1306) and a corresponding digital certificate that has not expired or been revoked.

If the device determines that it has valid security credentials, then the device performs regular startup and authenticated communication using the existing security credentials (1604). For example, the device 1402 completes boot up without running its device provisioning API (e.g., device provisioning API 1310) and proceeds to perform regular functions, such as sensor data collection, firmware update, reconfiguration, among others. The device 1402 also performs authenticated communication, using the existing valid device certificate, with other devices or entities (e.g., entity 1408) in the vehicle in which the device is deployed, or with external devices or entities associated with the enterprise. For example, the device 1402 performs authenticated communication with a manifest server that sends commands and data to reconfigure the device 1402, or to update the device firmware.

On the other hand, if the device determines that it does not have a valid security credentials, then the device launches its device provisioning API and establishes a connection with a provisioning service (1606). For example, when the device 1402 is powered up and booted for the first time following installation in the vehicle, or the device's existing digital certificate has been revoked or has expired, then the device 1402 determines that it does not have valid security credentials, and that the device has to be provisioned (or reprovisioned if the digital certificate has been revoked or has expired). The device 1402 launches its device provisioning API (e.g., device provisioning API 1310) and sends a connection request to one or more network servers associated with the enterprise that are running the provisioning service 1404, which accordingly establishes a connection with the device provisioning API running on the device 1402. As described previously, in some embodiments, the device 1402 establishes a connection with a local proxy for the provisioning service, e.g., provisioning local proxy 1404a, which then establishes a connection with the remote network servers hosting the provisioning service 1404 in the enterprise remote center 1410. In some embodiments, the device 1402 establishes the connection directly with a remote network server hosting the provisioning service 1404 in the enterprise remote center 1410.

The device authenticates the provisioning service (1608). For example, the provisioning service 1404 network server sends a digital certificate corresponding to the provisioning service 1404 to the device 1402, which authenticates the provisioning service's certificate using a challenge-response mechanism and the root CA certificate that is pre-configured in the device 1402, in a manner as described previously.

If the device cannot successfully authenticate the provisioning service based on the service's digital certificate, then the device aborts the connection and restarts the process 1600, attempting to connect to the provisioning service again. On the other hand, if the device successfully authenticates the provisioning service, then the device receives key generation instructions from the provisioning service (1610). For example, when the provisioning service 1404 is successfully authenticated, the provisioning service 1404 sends instructions to the device 1402, which commands the device to generate a key pair. In some embodiments, the instructions are received at the device via the provisioning service local proxy, e.g., provisioning service local proxy 1404a.

The device generates a public-private key pair (1612). For example, upon receiving the key generation command from the provisioning service 1404, the device 1402 (e.g., the security module 1306 in the device) generates a public-private key pair. In some embodiments, the key pair is generated using RSA encryption algorithm, or ECC. In some embodiments, the key pair is generated ElGamal algorithm, Digital Signature Standard (DSS), Cramer-Shoup cryptosystem, Paillier cryptosystem, or YAK authenticated key agreement protocol, among other suitable algorithms. The device 1402 stores the private key securely within the device, e.g., in security module 1306.

The device generates a certificate signing request (CSR) (1614). For example, in addition to generating a key pair, the device 1402 generates a CSR, which includes the public key of the key pair, and the identity of the device (e.g., device serial number, or a combination of device manufacturer name or number and device serial number).

The device sends the CSR to the provisioning service (1616). For example, the device 1402 sends the CSR to the provisioning service 1404 as a response to the key generation instructions. In some embodiments, the device 1402 sends the CSR to the provisioning local proxy 1404a, which forwards the CSR to the remote network server(s) hosting the provisioning service 1404.

The device receives a device certificate and/or enterprise CA certificate from the provisioning service (1618). For example, upon receiving the CSR from the device 1402, the provisioning service 1404 checks whether the device's identity is present in a record in the database of active devices, or whether the device 1402 is already provisioned (e.g., the device already has valid credentials, such as a digital certificate), or both. If the checks indicate that the device's identity is recorded, and that the device does not have valid credentials, then the provisioning service 1404 sends the device CSR to the enterprise CA 1406. Upon receiving the CSR, the enterprise CA 1406 generates a digital certificate for the device, and sends to the provisioning service 1404 a response, which includes the generated digital certificate for the device and one or more intermediate CA certificates. As described previously, in some embodiments, the digital certificate for the device, or the intermediate CA certificates, or both, are x509 certificates. In some embodiments, the digital certificate for the device, or the intermediate CA certificates, or both, are SPKI certificates, or OpenPGP certificates. The provisioning service 1404 records the device certificate received from the enterprise CA 1406, and then forwards the device certificate and the one or more intermediate CA certificates to the device 1402.

The device authenticates the one or more intermediate CA certificates using a root CA certificate (1620). For example, the device 1402 obtains the one or more intermediate CA certificates from the message received from the provisioning service 1404, and verifies the authenticity of these certificates using the root CA public key that is pre-configured on the device.

If the device cannot successfully verify the authenticity of one or more intermediate CA certificates, then the device aborts the provisioning process. In some embodiments, the device restarts the process 1600, attempting to connect to the provisioning service again. On the other hand, if the device successfully authenticates the intermediate CA certificates, then the device authenticates the device certificate using the authenticated CA certificate (1622). For example, upon successfully authenticating the intermediate CA certificates, the device 1402 obtains the public key of the enterprise CA 1406 from the corresponding enterprise CA certificate, and then authenticates the device certificate generated by the enterprise CA 1406 using the public key of the enterprise CA, following standard certificate authentication protocols.

If the device cannot successfully verify the authenticity of the device digital certificate, then the device aborts the provisioning process. In some embodiments, the device restarts the process 1600, attempting to connect to the provisioning service again. On the other hand, if the device successfully authenticates the device certificate, then the device stores the authenticated device certificate in memory and uses the device certificate for authenticated communication with enterprise entities (1624). For example, upon successfully authenticating the device digital certificate, the device 1402 stores its digital certificate and the one or more intermediate CA certificates in storage memory coupled to the device (e.g., in storage 1304 or security module 1306). The device 1402 is now provisioned for authenticated communication in the enterprise environment, using the existing valid device certificate. For example, the device 1402 performs authenticated communication with other devices or entities (e.g., entity 1408) in the vehicle in which the device is deployed, or with external devices or entities associated with the enterprise.

Figure 17:
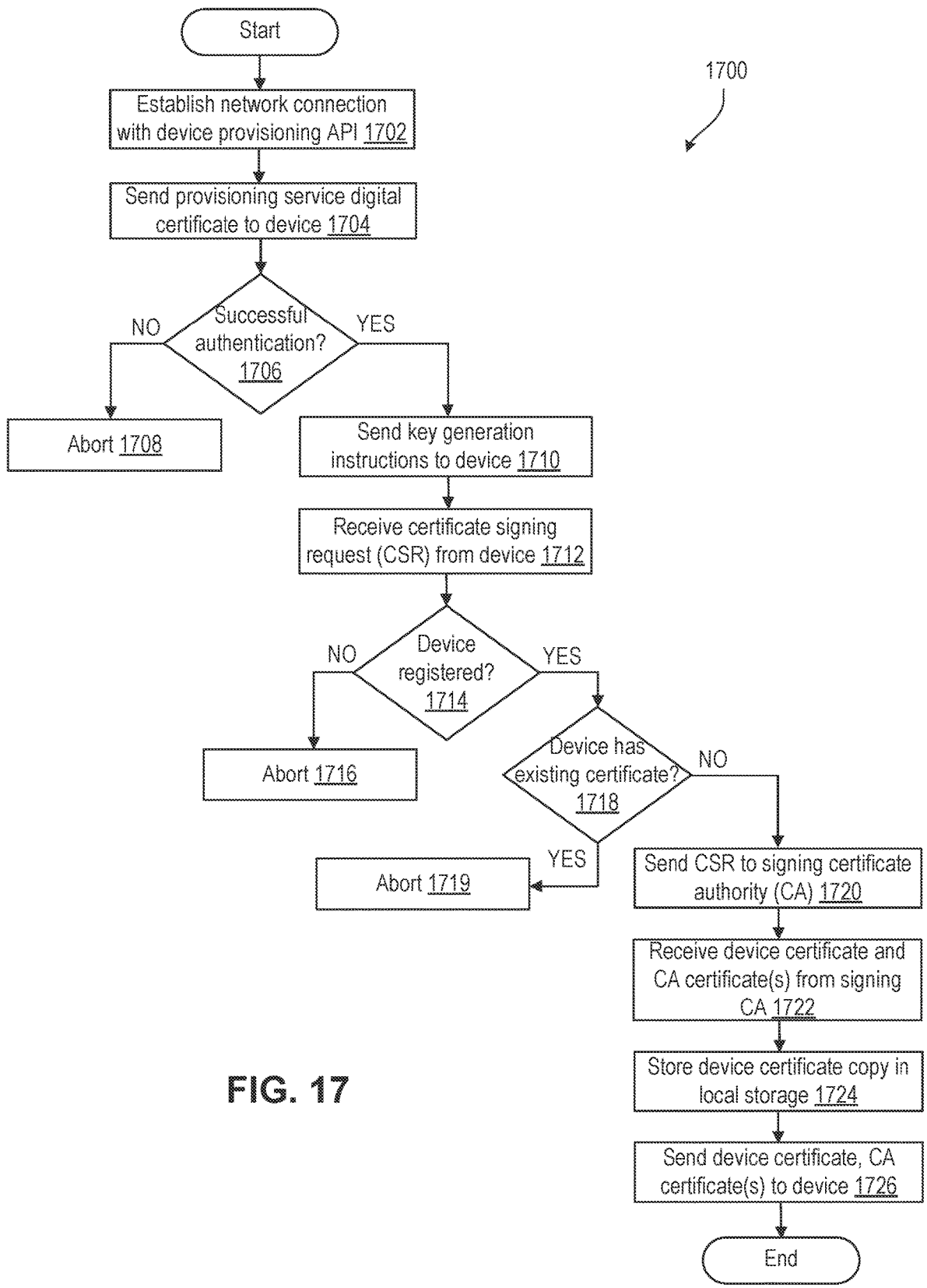
FIG. 17 shows an example process for provisioning an electronic device that is a component in a vehicle associated with an enterprise.

FIG. 17 shows an example process 1700 for provisioning an electronic device that is a component in a vehicle associated with an enterprise. In some embodiments, the process 1700 is performed by the provisioning service 1404 associated with the enterprise, to facilitate provision of security credentials (e.g., public-private key pair or digital certificate) to a device 1402 that is deployed in a vehicle associated with the enterprise. Accordingly, the process 1700 is described in the following sections with respect to the provisioning service 1404 and the system 1400. However, the process 1700 can also be performed by other entities in the enterprise system.

In the process 1700, the provisioning service establishes a network connection with a device provisioning API (1702). For example, a network server running the provisioning service 1404 receives a connection request from the device provisioning API (e.g., device provisioning API 1310) running on the device 1402. In response to the connection request, the provisioning service 1404 establishes a connection with the device provisioning API running on the device 1402. As described previously, in some embodiments, the communication/connection between the device 1402 and the provisioning service 1404 is through a provisioning local proxy 1404a.

The provisioning service sends its digital certificate to the device (1704). For example, once the connection is established with the device 1402, the provisioning service 1404 sends a digital certificate corresponding to the provisioning service to the device provisioning API running on the device 1402.

The provisioning service determines whether the authentication is successful (1706). For example, the device 1402 authenticates the provisioning service's certificate using a challenge-response mechanism, in a manner as described previously.

If the authentication is not successful, then the process is aborted (1708). For example, if the device 1402 cannot successfully authenticate the provisioning service 1404 based on the service's digital certificate, then the device aborts the connection, and provisioning service 1404 closes the connection to the device 1402.

On the other hand, if the authentication is successful, then the provisioning service sends key generation instructions to the device (1710). For example, when the provisioning service 1404 is successfully authenticated, the provisioning service 1404 sends instructions to the device 1402, which commands the device to generate a key pair. In some embodiments, the instructions are sent to the provisioning service local proxy, e.g., provisioning service local proxy 1404a, which forwards the instructions to the device 1402.

The provisioning service receives a certificate signing request (CSR) from the device (1712). For example, upon receiving the key generation instructions from the provisioning service 1404, the device 1402 generates a public-private key pair and a CSR, which includes the public key and the identity of the device. The device 1402 sends the CSR to the provisioning service 1404. In some embodiments, the device 1402 sends the CSR to the provisioning local proxy 1404a, which forwards the CSR to the remote network server(s) hosting the provisioning service 1404.

The provisioning service determines if the device is registered (1714). For example, upon receiving the CSR from the device 1402, the provisioning service 1404 checks whether the device's identity is present in a record in the database of active devices.

If the provisioning service determines that the device is not registered, then the provisioning service aborts (1716). For example, if the provisioning service 1404 cannot find the device 1402 recorded in its database of active devices, then the provisioning service 1404 rejects the CSR and aborts the provisioning. In some embodiments, the provisioning service 1404 generates an audit log entry to note that a provisioning attempt was made from an unregistered device. This can be the case, for example, when an unauthorized device attempts to obtain valid credentials from the enterprise.

On the other hand, if the provisioning service determines that the device is registered, then the provisioning service further checks whether the device has an existing valid certificate (1718). For example, upon determining that the device 1402 is registered, the provisioning service 1404 further checks whether the device 1402 is already provisioned, e.g., the device 1402 already has a valid digital certificate.

If the check indicates that the device has an existing certificate, then the provisioning service aborts (1719). For example, if the provisioning service 1404 determines that a valid digital certificate for the device 1402 is recorded in its database, indicating that the device 1402 is already provisioned, then the provisioning service 1404 rejects the CSR from the device 1402 and aborts the provisioning. In some embodiments, the provisioning service 1404 takes further action to resolve the discrepancy. For example, the provisioning service can notify an administrator to de-provision the device 1402 by revoking the device certificate. In some embodiments, the provisioning service 1404 generates an alert to notify a conflicting provisioning request. This might be the case, for example, when an unauthorized device attempted to spoof an authorized device, such that both the authorized device and the unauthorized device requested provisioning.

On the other hand, if the check (1718) indicates that the provisioning service does not have valid credentials, then the provisioning service sends the device CSR to a signing certificate authority (1720). For example, if the provisioning service 1404 determines that the device 1402 is registered but does not have a valid digital certificate, then the provisioning service 1404 sends the CSR from the device 1402 to the enterprise CA 1406.

The provisioning service receives a device certificate and one or more CA certificates from the signing CA (1722). For example, the enterprise CA 1406 generates a digital certificate for the device 1402 upon receiving the CSR from the provisioning service 1404, and sends a response to the provisioning service 1404. The response includes the generated digital certificate for the device 1402 and one or more intermediate CA certificates. As described previously, the digital certificate for the device, or the intermediate CA certificates, or both, can be x509 certificates, SPKI certificates, or OpenPGP certificates.

The provisioning service stores a copy of the device certificate in local storage (1724). For example, upon receiving the response from the enterprise CA 1406, the provisioning service 1404 makes a copy of the device certificate for local storage. In some embodiments, the provisioning service 1404 links the local copy to the record for the device 1402 that is in the database of active devices.

The provisioning service sends the device certificate and the one or more CA certificates to the device (1726). For example, the provisioning service 1404 forwards the device certificate and the one or more intermediate CA certificates that are received from the enterprise CA 1406, to the device 1402. In some embodiments, the provisioning service 1404 sends the certificates to the provisioning local proxy 1404*a*, which forwards the certificates to the device 1402. The device 1402 stores the certificates as described with respect to the process 1600.

Figure 18:
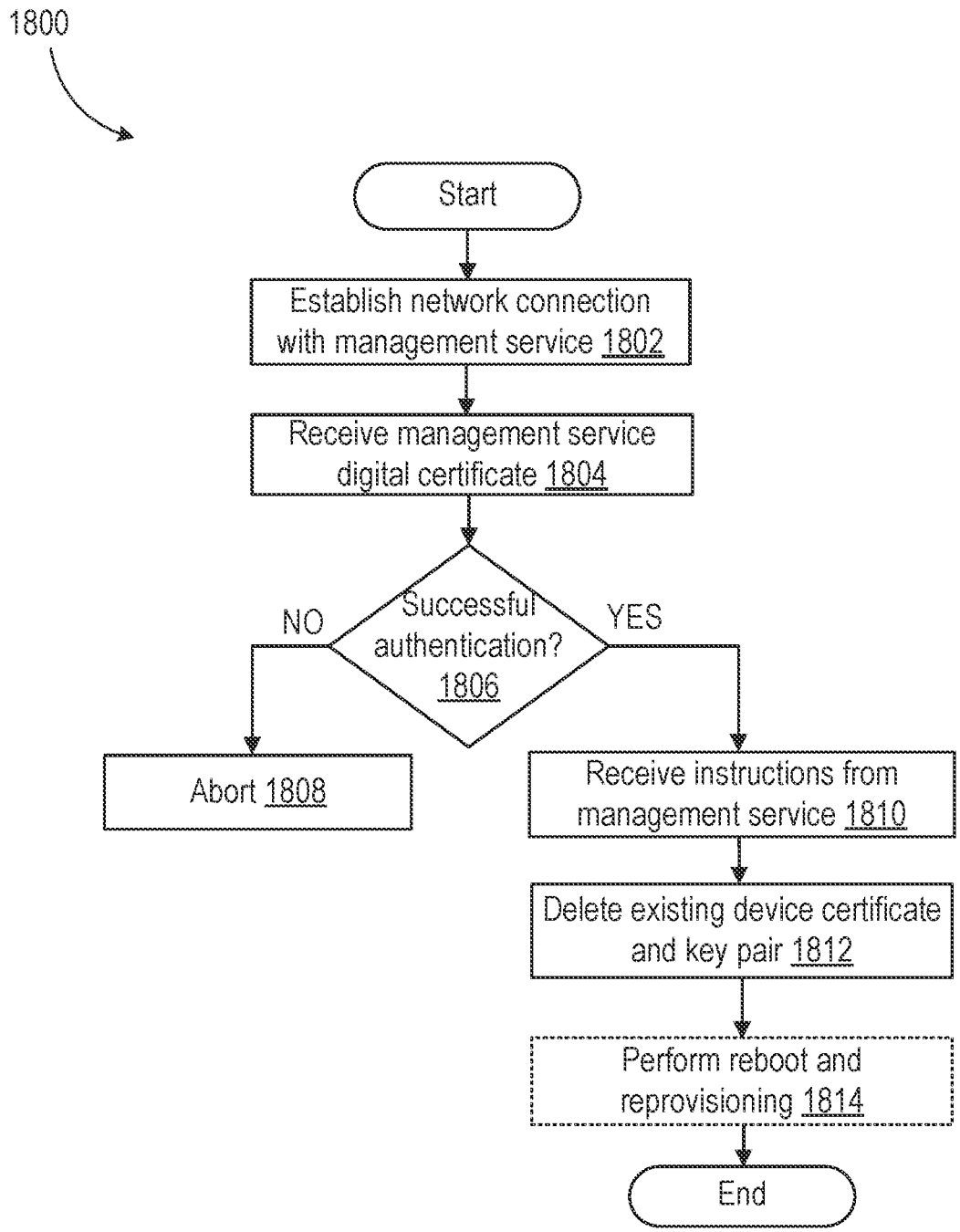
FIG. 18 shows an example process for changing the provisioning status of an electronic device that is a component in a vehicle associated with an enterprise.

FIG. 18 shows an example process 1800 for changing the provisioning status of an electronic device that is a component in a vehicle associated with an enterprise. In some embodiments, the process 1800 is performed by the device 1402 that is deployed in a vehicle associated with an enterprise to reprovision the device, e.g., obtain refreshed security credentials (e.g., public-private key pair or digital certificate) for authenticated communication with other devices and entities that are associated with the enterprise system. In some embodiments, the process 1800 is performed by the device 1402 when the device is decommissioned, e.g., removed from service in the enterprise system. Accordingly, the process 1800 is described in the following sections with respect to the device 1402 and the system 1400. However, the process 1800 can also be performed by other devices. As described previously, in some embodiments, the device 1402 is similar to the device 1300. Accordingly, in describing the process 1800, hardware components and functions of the device 1402 are described with reference to the hardware components and functions of the device 1300.

The process 1800 starts when the device establishes a network connection with the management service (1802). For example, the device management API in the device 1402 (e.g., device management API 1312) receives a connection request from a management service associated with the enterprise (e.g., management service 1514). In some embodiments, the management service represents one or more management servers of the enterprise (e.g., located at the enterprise remote center 1410). In some embodiments, a server running the management service sends the connection request.

The device receives a digital certificate corresponding to the management service (1806). For example, upon establishing the connection with the device 1402, the management service and the device 1402 mutually authenticate each other. For the mutual authentication, the management service sends its digital certificate to the device 1402. In some embodiments, the device 1402 also sends its digital certificate to the management service.

The device determines if authentication is successful (1806). For example, the device 1402 and the management service authenticate one another using the other's digital certificate and a challenge-response mechanism, as described previously.

If the authentication is not successful, then the process is aborted (1808). For example, if the device 1402 cannot successfully authenticate the management service based on the service's digital certificate, then the device aborts. Alternatively, if the management service cannot successfully authenticate the device 1402 based on the device's digital certificate, then the management service aborts.

On the other hand, if authentication is successful, then the device receives instructions from the provisioning service (1810). For example, following successful mutual authentication, the management service sends instructions to the device 1402. In some embodiments, the instructions include a deprovision command. In some embodiments, the instructions include a decommissioning command.

The device deletes existing device certificate and key pair (1812). For example, upon receiving the deprovision command (or decommission command, as applicable), device management API in the device 1402 (e.g., device management API 1312) deletes its existing digital certificate and the public-private key pair that are stored in the device, e.g., in security module 1306 of the device. In some embodiments, the device management API also deletes the enterprise CA digital certificates that are stored by the device.

Optionally, in some embodiments, the device performs reboot and reprovisioning (1814). This is the case, for example, when the process 1800 is used to reprovision the device. In such embodiments, following deleting the existing device certificate and key pair (1812) in response to receiving the deprovision command from the management service (1810), the device management API resets the security module (e.g., security module 1306) and reboots the device. For example, the device management API resets one or more cryptographic counters in the security module that are used for key generation, performing garbage collection in the security module memory, among other suitable functions. The device 1402 is then rebooted; when the device 1402 is power back up, the device proceeds to reprovision, e.g., generate a new public-private key pair and obtain a digital certificate, as described previously with respect to the process 1600.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   receiving, using at least one processor associated with a network server, a request from a second server associated with the network server to register a device in a vehicle, the request comprising an identifier of the device;
   in response to receiving the request, registering the device using the at least one processor, the registering comprising recording the identifier of the device in a database of active devices;
   receiving, using the at least one processor, a certificate signing request from the device, the certificate signing request to provide a device security certificate to the device, wherein the device security certificate for the device is to enable authentication of the device during communication with another entity;
   obtaining, using the at least one processor, an identifier of the device from the certificate signing request;
   determining, using the at least one processor, whether an existing device security certificate is available for the device based on the identifier; and
   sending, using the at least one processor, the certificate signing request to a certificate authority server associated with the network server upon determining that an existing device security certificate is not available;
   receiving, using the at least one processor, a device security certificate for the device from the certificate authority server; and
   sending, using the at least one processor, the device security certificate to the device.

2. The method of claim 1, wherein determining whether an existing device security certificate is available for the device comprises:
   determining whether the device is registered in the database of active devices using the identifier; and
   upon determining that the device is registered, determining whether an existing device security certificate is available for the device using the identifier.

3. The method of claim 1, further comprising:
   storing the device security certificate in storage coupled to the network server;
   receiving, from a management service associated with the network server, instructions to decommission the device, the instructions including the identifier of the device;
   in response to receiving the instructions to decommission the device:
      accessing, using the identifier of the device obtained from the instructions, the device security certificate from the storage, and
      deleting the device security certificate from the storage; and
   removing the identifier of the device from the database of active devices.

4. The method of claim 1, wherein the certificate signing request is received over a network connection between the network server and the device in the vehicle, the method further comprising:
   receiving a connection request from the device;
   establishing a communication session with the device over the network connection in response to the request; and
   receiving the certificate signing request from the device following establishment of the communication session, wherein the device security certificate is sent to the device in the communication session.

5. The method of claim 1, further comprising:
   storing the device security certificate in storage coupled to the network server;
   receiving, from a management service associated with the network server, instructions to deprovision the device, the instructions including the identifier of the device;
   in response to receiving the instructions to deprovision the device, accessing, using the identifier of the device obtained from the instructions, the device security certificate from the storage; and
   deleting the device security certificate from the storage.

6. The method of claim 1, further comprising:
   receiving a second certificate signing request from a second device in a second vehicle, the second certificate signing request to provide a device security certificate to the second device;
   obtaining a second identifier of the second device from the second certificate signing request;
   determining, using the second identifier, that an existing device security certificate is available for the second device at the network server; and
   in response to determining that an existing device security certificate is available for the second device at the network server:

revoking the existing device security certificate for the second device,
generating an audit log entry, and
terminating communication with the second device.

7. The method of claim 1, further comprising:
receiving a second certificate signing request from a second device in a second vehicle, the second certificate signing request to provide a device security certificate to the second device;
obtaining a second identifier of the second device from the second certificate signing request;
determining, using the second identifier, that the second device is not registered in a database of active devices; and
in response to determining that the second device is not registered in the database of active devices:
generating an audit log entry, and
terminating communication session with the second device.

8. A network server, comprising:
one or more processors;
memory storing instructions that, when executed, are configured to cause the one or more processors to perform operations comprising:
receiving a request from a second server associated with the network server to register a device in a vehicle, the request comprising an identifier of the device;
in response to receiving the request, registering the device, comprising recording the identifier of the device in a database of active devices;
receiving a certificate signing request from the device, the certificate signing request to provide a device security certificate to the device, wherein the device security certificate for the device is to enable authentication of the device during communication with another entity;
obtaining an identifier of the device from the certificate signing request;
determining whether an existing device security certificate is available for the device based on the identifier; and
sending the certificate signing request to a certificate authority server associated with the network server upon determining that an existing device security certificate is not available;
receiving a device security certificate for the device from the certificate authority server; and
sending the device security certificate to the device.

9. The network server of claim 8, wherein determining whether an existing device security certificate is available for the device comprises:
determining whether the device is registered in the database of active devices using the identifier; and
upon determining that the device is registered, determining whether an existing device security certificate is available for the device using the identifier.

10. The network server of claim 8, the operations further comprising:
storing the device security certificate in storage coupled to the network server;
receiving, from a management service associated with the network server, instructions to decommission the device, the instructions including the identifier of the device;
in response to receiving the instructions to decommission the device:
accessing, using the identifier of the device obtained from the instructions, the device security certificate from the storage, and
deleting the device security certificate from the storage; and
removing the identifier of the device from the database of active devices.

11. The network server of claim 8, wherein the certificate signing request is received over a network connection between the network server and the device in the vehicle, the operations further comprising:
receiving a connection request from the device;
establishing a communication session with the device over the network connection in response to the request; and
receiving the certificate signing request from the device following establishment of the communication session, wherein the device security certificate is sent to the device in the communication session.

12. The network server of claim 8, the operations further comprising:
storing the device security certificate in storage coupled to the network server;
receiving, from a management service associated with the network server, instructions to deprovision the device, the instructions including the identifier of the device;
in response to receiving the instructions to deprovision the device, accessing, using the identifier of the device obtained from the instructions, the device security certificate from the storage; and
deleting the device security certificate from the storage.

13. The network server of claim 8, the operations further comprising:
receiving a second certificate signing request from a second device in a second vehicle, the second certificate signing request to provide a device security certificate to the second device;
obtaining a second identifier of the second device from the second certificate signing request;
determining, using the second identifier, that an existing device security certificate is available for the second device at the network server; and
in response to determining that an existing device security certificate is available for the second device at the network server:
revoking the existing device security certificate for the second device,
generating an audit log entry, and
terminating communication with the second device.

14. The network server of claim 8, the operations further comprising:
receiving a second certificate signing request from a second device in a second vehicle, the second certificate signing request to provide a device security certificate to the second device;
obtaining a second identifier of the second device from the second certificate signing request;
determining, using the second identifier, that the second device is not registered in a database of active devices; and
in response to determining that the second device is not registered in the database of active devices:
generating an audit log entry, and
terminating communication session with the second device.

15. One or more non-transitory computer-readable media storing instructions that, when executed, are configured to cause one or more processors to perform operations comprising:

receiving, at a network server, a request from a second server associated with the network server to register a device in a vehicle, the request comprising an identifier of the device;

in response to receiving the request, registering the device, comprising recording the identifier of the device in a database of active devices;

receiving a certificate signing request from the device, the certificate signing request to provide a device security certificate to the device, wherein the device security certificate for the device is to enable authentication of the device during communication with another entity;

obtaining an identifier of the device from the certificate signing request;

determining whether an existing device security certificate is available for the device based on the identifier; and sending the certificate signing request to a certificate authority server associated with the network server upon determining that an existing device security certificate is not available;

receiving a device security certificate for the device from the certificate authority server; and sending the device security certificate to the device.

16. The one or more non-transitory computer-readable media of claim 15, wherein determining whether an existing device security certificate is available for the device comprises:

determining whether the device is registered in the database of active devices using the identifier; and upon determining that the device is registered, determining whether an existing device security certificate is available for the device using the identifier.

17. The one or more non-transitory computer-readable media of claim 15, the operations further comprising:

storing the device security certificate in storage coupled to the network server;

receiving, from a management service associated with the network server, instructions to decommission the device, the instructions including the identifier of the device;

in response to receiving the instructions to decommission the device:
  accessing, using the identifier of the device obtained from the instructions, the device security certificate from the storage, and
  deleting the device security certificate from the storage; and
  removing the identifier of the device from the database of active devices.

18. The one or more non-transitory computer-readable media of claim 15, wherein the certificate signing request is received over a network connection between the network server and the device in the vehicle, the operations further comprising:

receiving a connection request from the device;

establishing a communication session with the device over the network connection in response to the request; and receiving the certificate signing request from the device following establishment of the communication session, wherein the device security certificate is sent to the device in the communication session.

19. The one or more non-transitory computer-readable media of claim 15, the operations further comprising:

storing the device security certificate in storage coupled to the network server;

receiving, from a management service associated with the network server, instructions to deprovision the device, the instructions including the identifier of the device;

in response to receiving the instructions to deprovision the device, accessing, using the identifier of the device obtained from the instructions, the device security certificate from the storage; and deleting the device security certificate from the storage.

20. The one or more non-transitory computer-readable media of claim 15, the operations further comprising:

receiving a second certificate signing request from a second device in a second vehicle, the second certificate signing request to provide a device security certificate to the second device;

obtaining a second identifier of the second device from the second certificate signing request;

determining, using the second identifier, that an existing device security certificate is available for the second device at the network server; and in response to determining that an existing device security certificate is available for the second device at the network server:
  revoking the existing device security certificate for the second device,
  generating an audit log entry, and
  terminating communication with the second device.

21. The one or more non-transitory computer-readable media of claim 15, the operations further comprising:

receiving a second certificate signing request from a second device in a second vehicle, the second certificate signing request to provide a device security certificate to the second device;

obtaining a second identifier of the second device from the second certificate signing request;

determining, using the second identifier, that the second device is not registered in a database of active devices; and in response to determining that the second device is not registered in the database of active devices:
  generating an audit log entry, and
  terminating communication session with the second device.

* * * * *